(12) United States Patent
Gschwind

(10) Patent No.: US 9,372,695 B2
(45) Date of Patent: Jun. 21, 2016

(54) OPTIMIZATION OF INSTRUCTION GROUPS ACROSS GROUP BOUNDARIES

(71) Applicant: GLOBALFOUNDRIES Inc., Grand Cayman (KY)

(72) Inventor: Michael K. Gschwind, Chappaqua, NY (US)

(73) Assignee: GLOBALFOUNDRIES Inc., Grand Cayman (KY)

( * ) Notice: Subject to any disclaimer, the term of this patent is extended or adjusted under 35 U.S.C. 154(b) by 399 days.

(21) Appl. No.: 13/931,680

(22) Filed: Jun. 28, 2013

(65) Prior Publication Data

US 2015/0006866 A1    Jan. 1, 2015

(51) Int. Cl.
*G06F 9/30* (2006.01)
*G06F 9/45* (2006.01)
*G06F 9/38* (2006.01)
*G06F 9/455* (2006.01)

(52) U.S. Cl.
CPC .............. *G06F 9/30145* (2013.01); *G06F 8/41* (2013.01); *G06F 8/433* (2013.01); *G06F 8/443* (2013.01); *G06F 9/3822* (2013.01); *G06F 9/3853* (2013.01); *G06F 9/455* (2013.01)

(58) Field of Classification Search
None
See application file for complete search history.

(56) References Cited

U.S. PATENT DOCUMENTS

| | | | |
|---|---|---|---|
| 5,175,856 A * | 12/1992 | Van Dyke | G06F 8/41 711/E12.006 |
| 5,179,702 A * | 1/1993 | Spix | G06F 8/41 711/E12.006 |
| 5,448,746 A | 9/1995 | Eickemeyer et al. | |
| 5,551,013 A | 8/1996 | Beausoleil et al. | |
| 5,574,873 A | 11/1996 | Davidian | |
| 5,613,080 A | 3/1997 | Ray et al. | |
| 5,613,117 A * | 3/1997 | Davidson | G06F 8/433 717/144 |
| 5,790,825 A | 8/1998 | Traut | |
| 5,815,719 A * | 9/1998 | Goebel | G06F 8/4441 717/146 |
| 5,832,260 A | 11/1998 | Arora et al. | |
| 5,854,933 A * | 12/1998 | Chang | G06F 8/4442 712/228 |
| 5,966,539 A * | 10/1999 | Srivastava | G06F 8/433 717/147 |

(Continued)

FOREIGN PATENT DOCUMENTS

| | | | |
|---|---|---|---|
| JP | 06028324 A * | 2/1994 | |
| JP | 406028324 A | 2/1994 | |

(Continued)

OTHER PUBLICATIONS

'Processor Microarchitecture—An Implementation Perspective' by Gonzalez et al., copyright 2011, pp. 34-37.*

(Continued)

*Primary Examiner* — Steven Snyder
(74) *Attorney, Agent, or Firm* — Heslin Rothenberg Farley & Mesiti P.C.

(57) ABSTRACT

Instructions grouped into instruction groups are optimized across group boundaries. Instruction sequences spanning multiple groups are optimized by retaining information relating to an instruction at the end of one instruction group to be co-optimized with an instruction at the beginning of a subsequent instruction group. This retained information is then used in optimization of one or more instructions of the subsequent group. Optimization may be performed across n group boundaries, where n is equal to two or greater. Additionally, optimization of instructions within a group may be performed, in addition to the optimizations across group boundaries.

15 Claims, 24 Drawing Sheets

(56) References Cited

U.S. PATENT DOCUMENTS

| | | | | |
|---|---|---|---|---|
| 6,000,028 | A * | 12/1999 | Chernoff | G06F 9/45504 712/226 |
| 6,009,261 | A | 12/1999 | Scalzi et al. | |
| 6,185,669 | B1 | 2/2001 | Hsu et al. | |
| 6,260,190 | B1 * | 7/2001 | Ju | G06F 8/445 712/205 |
| 6,286,094 | B1 | 9/2001 | Derrick et al. | |
| 6,308,255 | B1 | 10/2001 | Gorishek, IV et al. | |
| 6,463,582 | B1 | 10/2002 | Lethin et al. | |
| 6,651,164 | B1 * | 11/2003 | Soltis, Jr. | G06F 9/3853 712/216 |
| 6,711,670 | B1 * | 3/2004 | Soltis, Jr. | G06F 9/3838 712/215 |
| 7,028,286 | B2 * | 4/2006 | Larin | G06F 8/447 712/E9.028 |
| 7,257,806 | B1 * | 8/2007 | Chen | G06F 8/441 717/141 |
| 7,681,019 | B1 * | 3/2010 | Favor | G06F 9/4552 703/26 |
| 7,797,517 | B1 * | 9/2010 | Favor | G06F 9/30094 712/215 |
| 7,882,335 | B2 | 2/2011 | Luick et al. | |
| 7,925,860 | B1 * | 4/2011 | Juffa | G06F 9/3455 712/10 |
| 7,934,203 | B2 | 4/2011 | Lovett et al. | |
| 8,104,028 | B2 * | 1/2012 | Stoodley | G06F 9/45516 717/140 |
| 8,214,191 | B2 | 7/2012 | Ferren et al. | |
| 8,402,257 | B2 | 3/2013 | Ferren et al. | |
| 2002/0066086 | A1 | 5/2002 | Linden et al. | |
| 2002/0095667 | A1 * | 7/2002 | Archambault | G06F 8/443 717/154 |
| 2002/0161987 | A1 | 10/2002 | Altman et al. | |
| 2004/0133765 | A1 | 7/2004 | Tanaka et al. | |
| 2005/0010912 | A1 * | 1/2005 | Adolphson | G06F 8/4441 717/151 |
| 2005/0289530 | A1 | 12/2005 | Robinson et al. | |
| 2006/0010431 | A1 * | 1/2006 | Patil | G06F 8/52 717/131 |
| 2006/0130012 | A1 * | 6/2006 | Hatano | G06F 8/4441 717/136 |
| 2007/0050605 | A1 | 3/2007 | Ferren et al. | |
| 2007/0050609 | A1 | 3/2007 | Ferren et al. | |
| 2008/0126764 | A1 * | 5/2008 | Wu | G06F 9/466 712/226 |
| 2008/0177980 | A1 * | 7/2008 | Citron | G06F 8/441 712/205 |
| 2009/0204791 | A1 | 8/2009 | Luick | |
| 2009/0210666 | A1 | 8/2009 | Luick et al. | |
| 2009/0210668 | A1 * | 8/2009 | Luick | G06F 9/30043 712/216 |
| 2009/0210676 | A1 | 8/2009 | Luick et al. | |
| 2010/0306471 | A1 * | 12/2010 | Luick | G06F 12/127 711/122 |
| 2011/0119660 | A1 * | 5/2011 | Tanaka | G06F 8/4441 717/149 |
| 2011/0307961 | A1 | 12/2011 | De Perthuis et al. | |
| 2012/0311199 | A1 | 12/2012 | Bender et al. | |
| 2013/0042090 | A1 * | 2/2013 | Krashinsky | G06F 9/3016 712/214 |
| 2013/0086361 | A1 | 4/2013 | Gschwind et al. | |
| 2013/0086362 | A1 | 4/2013 | Gschwind et al. | |
| 2013/0086368 | A1 | 4/2013 | Gschwind et al. | |
| 2013/0086369 | A1 * | 4/2013 | Blainey | G06F 8/443 712/226 |
| 2013/0086570 | A1 * | 4/2013 | Blainey | G06F 9/3017 717/165 |
| 2015/0006852 | A1 | 1/2015 | Gschwind et al. | |
| 2015/0006867 | A1 | 1/2015 | Gschwind et al. | |
| 2015/0082008 | A1 | 3/2015 | Gschwind et al. | |

FOREIGN PATENT DOCUMENTS

| | | |
|---|---|---|
| WO | WO 2010/056511 A2 | 5/2010 |
| WO | WO 2012/144374 A1 | 10/2012 |

OTHER PUBLICATIONS

'Implementing Optimizations at Decode Time' by Ilhyun Kim and Mikko H. Lipasti, copyright 2002, IEEE.*

"Power ISA™ Version 2.07," International Business Machines Corporation, May 2013, pp. 1-1526.

"z/Architecture Principles of Operation," IBM® Publication No. SA22-7832-09, Tenth Edition, Sep. 2012, pp. 1-1568.

Salapura, et al., "Using Register Last-Use Information to Perform Decode-Time Computer Instruction Optimization," U.S. Appl. No. 13/251,486, filed Oct. 3, 2011, pp. 1-96.

Salapura, et al., "Generating Compiled Code that Indicates Register Liveness," U.S. Appl. No. 13/251,803, filed Oct. 3, 2011, pp. 1-54.

Salapura, et al., "Generating Compiled Code that Indicates Register Liveness," U.S. Appl. No. 13/664,595, filed Oct. 31, 2012, pp. 1-52.

Salapura, et al., "Prefix Computer Instruction for Compatibly Extending Instruction Functionality," U.S. Appl. No. 13/251,426, filed Oct. 3, 2011, pp. 1-85.

Salapura, et al., "Tracking Operand Liveliness Information in a Computer System and Performing Function Based on the Liveliness Information," U.S. Appl. No. 13/251,441, filed Oct. 3, 2011, pp. 1-75.

Salapura, et al., "Caching Optimized Internal Instructions in Loop Buffer," U.S. Appl. No. 13/432,512, filed Mar. 28, 2012, pp. 1-41.

Salapura et al., "Performing Predecode-Time Optimized Instructions in Conjunction with Predecode Time Optimized Instruction Sequence Caching," U.S. Appl. No. 13/432,357, filed Mar. 28, 2012, pp. 1-32.

Salapura et al., "Decode Time Instruction Optimization for Load Reserve and Store Conditional Sequences," U.S. Appl. No. 13/432,404, filed Mar. 28, 2012, pp. 1-52.

Salapura et al., "Decode Time Instruction Optimization for Load Reserve and Store Conditional Sequences," U.S. Appl. No. 13/783,985, filed Mar. 4, 2013, pp. 1-49.

Salapura et al., "Instruction Merging Optimization," U.S. Appl. No. 13/432,458, filed Mar. 28, 2012, pp. 1-36.

Salapura et al., "Instruction Merging Optimization," U.S. Appl. No. 13/790,580, filed Mar. 8, 2013, pp. 1-40.

Salapura et al., "Instruction Merging Optimization," U.S. Appl. No. 13/432,537, filed Mar. 28, 2012, pp. 1-35.

Salapura et al., "Instruction Merging Optimization," U.S. Appl. No. 13/790,632, filed Mar. 8, 2013, pp. 1-31.

Schwarz, E., "Modify and Execute Next Sequential Instruction Facility and Instructions Therefore," U.S. Appl. No. 13/710,494, filed Dec. 11, 2012, pp. 1-100.

Gschwind, Michael K., "Forming Instruction Groups Based on Decode Time Instruction Optimization," U.S. Appl. No. 13/931,689, filed Jun. 28, 2013, pp. 1-82.

Tendler et al., "POWER4 System Microarchitecture", IBM Journal of Research & Development, Jan. 2002 (pp. 5-25).

Kim et al., "Implementing Optimizations at Decode Time", 29th Annual International Symposium on Computer Architecture, May 2002 (pp. 221-232).

Gonzalez, Antonio, "Processor Microarchitecture—An Implementation Perspective", Morgan & Claypool Publishers, 2011 (No further date information available.), pp. 34-37 (+2 cover pages).

International Search Report & Written Opinion for PCT/JP2014/003267, dated Sep. 16, 2014 (10 pages).

Gschwind et al., Office Action for U.S. Appl. No. 13/931,698, filed Jun. 28, 2013 (U.S. Patent Publication No. 2015/0006852 Al), dated Nov. 12, 2015 (20 pages).

* cited by examiner

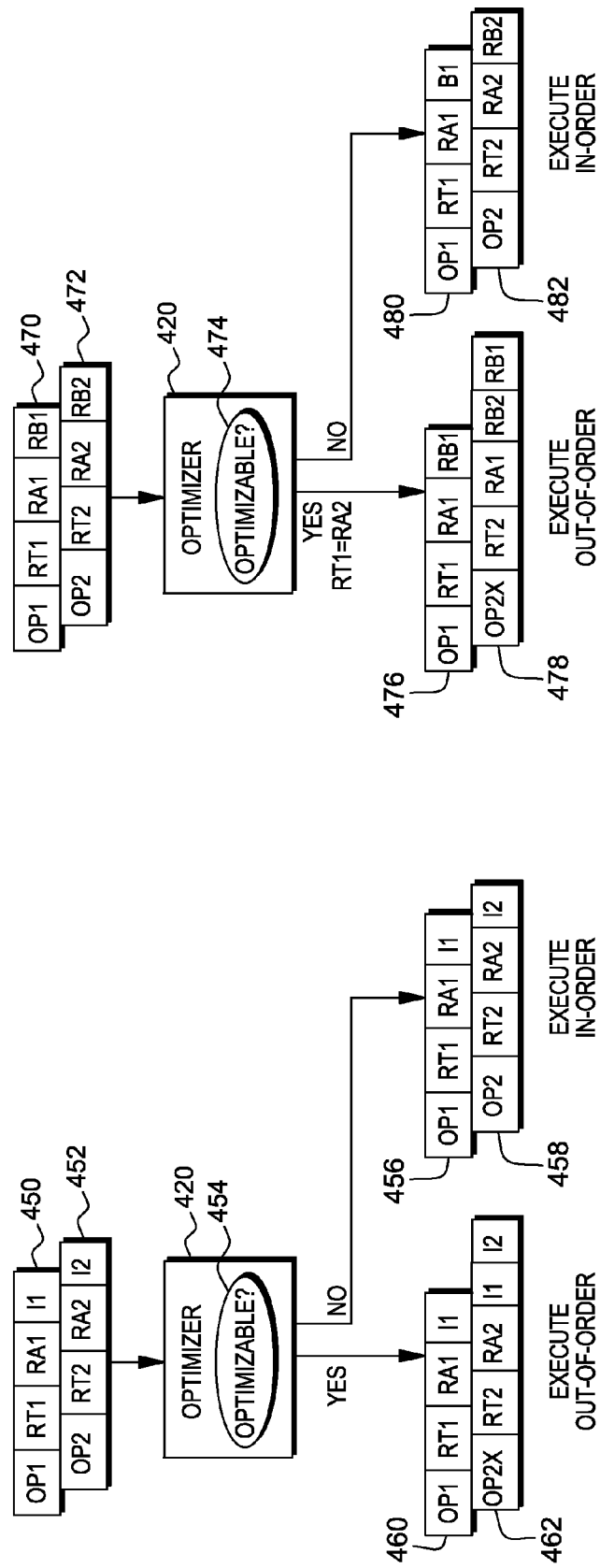

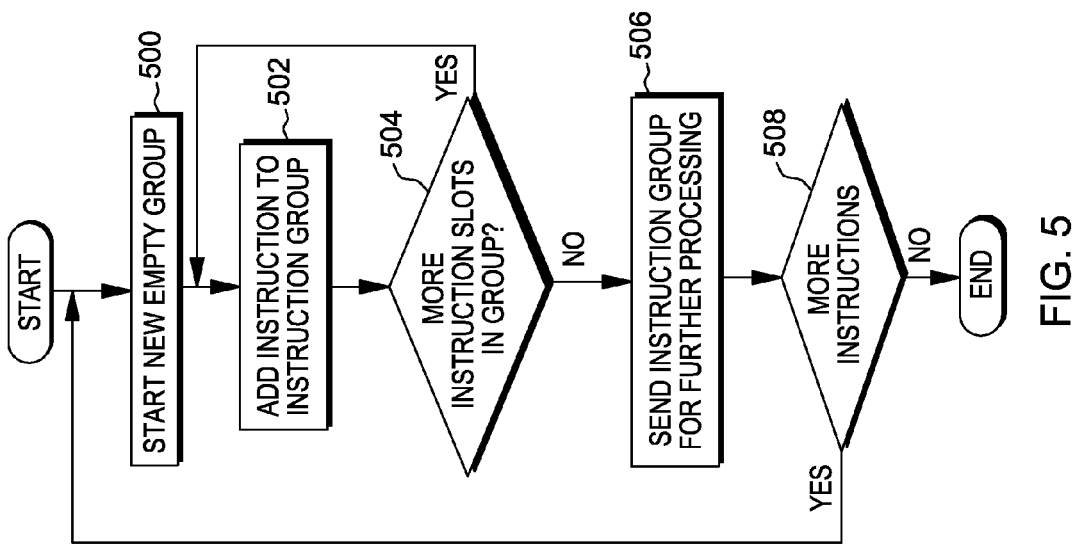

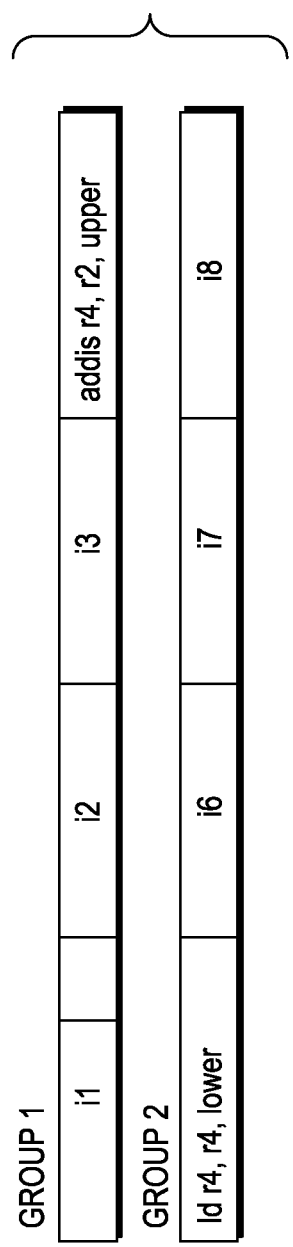

OPTIMIZATION OF INSTRUCTION GROUPS ACROSS GROUP BOUNDARIES

BACKGROUND

One or more aspects relate, in general, to processing within a processing environment, and in particular, to optimizing the processing.

Processors execute instructions that direct the processors to perform specific operations. The instructions may be part of user applications that perform user-defined tasks, or part of operating system applications that perform system level services, as examples.

One processing technique used by the processors to process the instructions is referred to as pipelined processing, in which processing is performed in stages. Example stages include a fetch stage in which the processor fetches an instruction from memory; a decode stage in which the fetched instruction is decoded; an execute stage in which the decoded instruction is executed; and a complete stage in which execution of the instruction is completed, including updating architectural state relating to the processing. Other and/or different stages are possible.

To facilitate processing within a pipelined processor, various optimization techniques are employed. One such technique includes decode time instruction optimization, which offers an opportunity to improve code execution by combining multiple instructions into a single internal instruction; recombining multiple instructions into multiple/fewer internal instructions; and/or recombining multiple instructions into multiple internal instructions with fewer data dependencies.

BRIEF SUMMARY

Shortcomings of the prior art are overcome and additional advantages are provided through the provision of a computer program product for facilitating processing within a processing environment. The computer program product includes a computer readable storage medium readable by a processing circuit and storing instructions for execution by the processing circuit for performing a method. The method includes, for instance, obtaining a first group of instructions; determining whether one or more instructions of the first group of instructions are to be optimized with one or more instructions of a second group of instructions; based on determining that the one or more instructions of the first group of instructions are to be optimized with one or more instructions of the second group of instructions, performing optimization across the first group of instructions and the second group of instructions; and executing at least one instruction resulting from performing the optimization.

Methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE SEVERAL VIEWS OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 4B depicts one example of an optimization provided by a decoder;

FIG. 4C depicts another example of an optimization provided by a decoder;

FIG. 5 depicts one embodiment of logic to form an instruction group;

FIG. 6 depicts an example of groups of instructions;

DETAILED DESCRIPTION

In accordance with one or more aspects, instructions grouped into instruction groups are optimized across group boundaries. As one example, instruction sequences spanning multiple groups are optimized by retaining information relating to an instruction at the end of one group to be co-optimized with an instruction at the beginning of a subsequent group. In a further aspect, optimizations are performed within a group and/or across groups.

This optimization capability may be used in many different processing environments executing different processors. For instance, it may be used with processors based on the z/Architecture offered by International Business Machines Corporation. One or more of the processors may be part of a server, such as the System z server, which implements the z/Architecture and is offered by International Business Machines Corporation. One embodiment of the z/Architecture is described in an IBM publication entitled, "z/Architecture Principles of Operation," IBM Publication No. SA22-7832-09, Tenth Edition, September 2012, which is hereby incorporated herein by reference in its entirety. In one example, one or more of the processors executes an operating system, such as the z/OS operating system, also offered by International Business Machines Corporation. IBM, Z/AR-CHITECTURE and Z/OS are registered trademarks of International Business Machines Corporation, Armonk, N.Y., USA. Other names used herein may be registered trademarks, trademarks, or product names of International Business Machines Corporation or other companies.

In a further embodiment, the processors are based on the Power Architecture offered by International Business Machines Corporation, and may be, for instance, Power 700 series processors. One embodiment of the Power Architecture is described in "Power ISA Version 2.07," International Business Machines Corporation, May 3, 2013, which is hereby incorporated herein by reference in its entirety. POWER ARCHITECTURE is a registered trademark of International Business Machines Corporation.

One particular example of a processing environment to incorporate and use one or more aspects of the optimization capability is described with reference to FIG. 1. In this particular example, the processing environment is based on the Power Architecture offered by International Business Machines Corporation, but this is only one example. One or more aspects are applicable to other architectures offered by International Business Machines Corporation or other companies.

Figure 1:
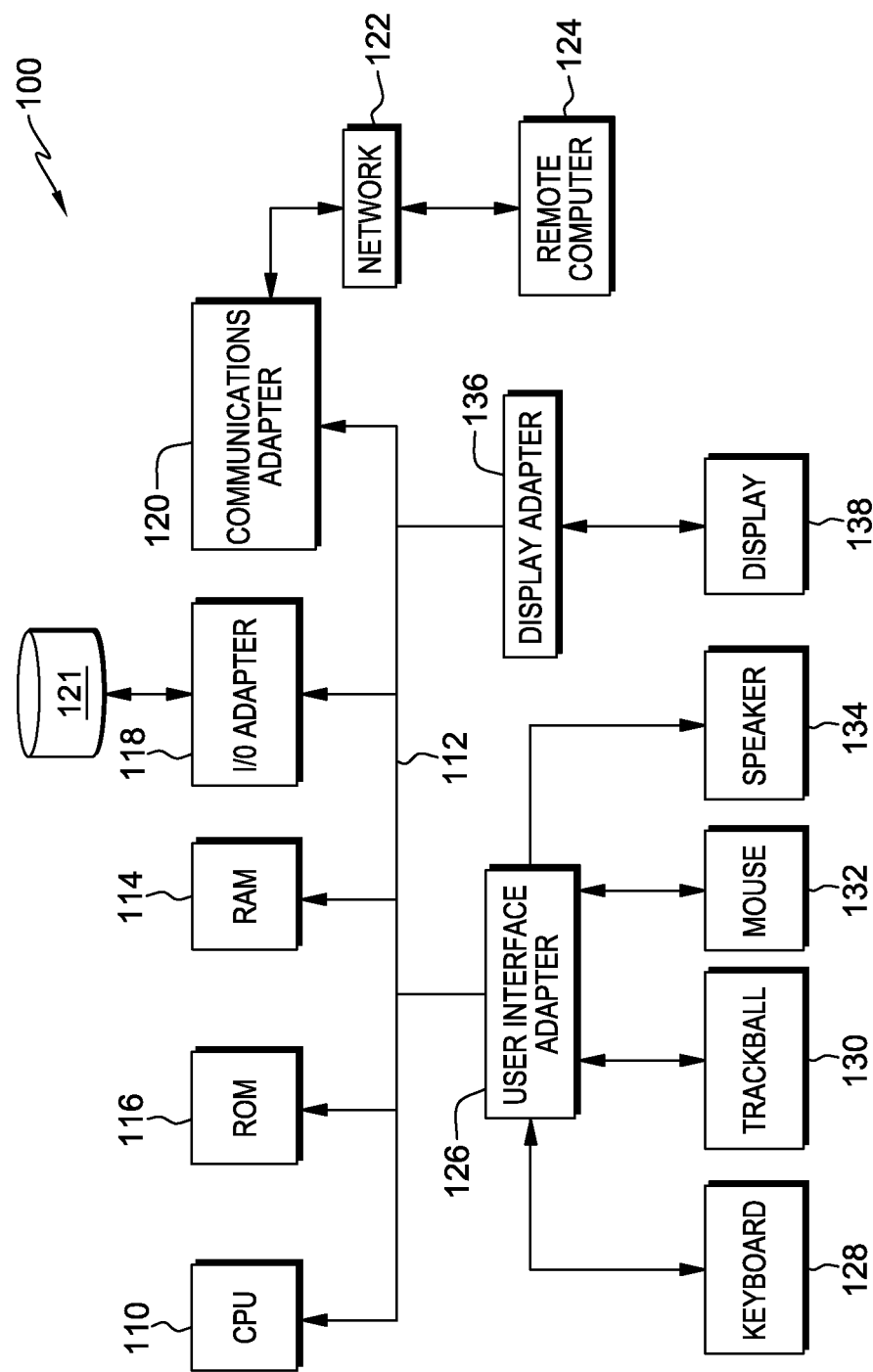
FIG. 1 depicts one embodiment of a processing environment to incorporate and use one or more aspects of an optimization capability.

Referring to FIG. 1, a processing environment 100 includes, for instance, a central processing unit (CPU) 110, which is coupled to various other components by an interconnect 112, including, for example, a read-only memory (ROM) 116 that includes a basic input/output system (BIOS) that controls certain basic functions of the processing environment, a random access memory (RAM) 114, an I/O adapter 118, and a communications adapter 120. I/O adapter 118 may be a small computer system interface (SCSI) adapter that communicates with a storage device 121. Communications adapter 120 interfaces interconnect 112 with a network 122, which enables processing environment 100 to communicate with other systems, such as remote computer 124.

Interconnect 112 also has input/output devices connected thereto via a user interface adapter 126 and a display adapter 136. Keyboard 128, trackball 130, mouse 132 and speaker 134 are all interconnected to bus 112 via user interface adapter 126. Display 138 is connected to system bus 112 by display adapter 136. In this manner, processing environment 100 receives input, for example, through keyboard 128, trackball 130, and/or mouse 132, and provides output, for example, via network 122, on storage device 121, speaker 134 and/or display 138, as examples. The hardware elements depicted in processing environment 100 are not intended to be exhaustive, but rather represent example components of a processing environment in one embodiment.

Operation of processing environment 100 can be controlled by program code, such as firmware and/or software, which typically includes, for example, an operating system such as AIX® (AIX is a trademark of International Business Machines Corporation) and one or more application or middleware programs. As used herein, firmware includes, e.g., the microcode, millicode and/or macrocode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware. Such program code comprises instructions discussed below with reference to FIG. 2.

Figure 2:
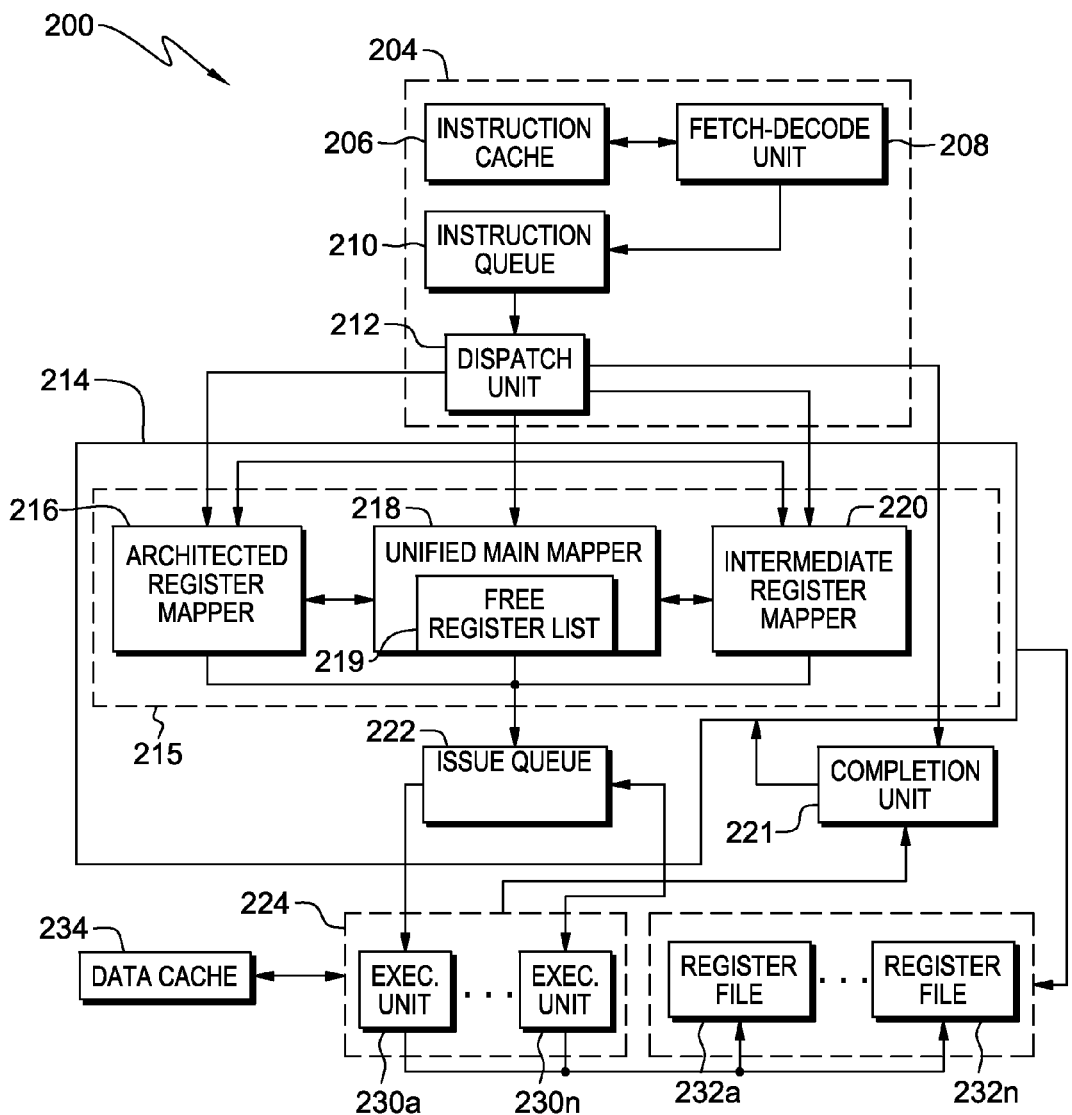
FIG. 2 depicts further details of a processor of the processing environment of FIG. 1.

Referring to FIG. 2, further details of a processor 200 (e.g., central processing unit 110) of the processing environment are discussed. In one example, the processor is a super-scalar processor, which retrieves instructions from memory (e.g., RAM 114 of FIG. 1) and loads them into instruction sequencing logic (ISL) 204 of the processor. The instruction sequencing logic includes, for instance, a Level 1 Instruction cache (L1 I-cache) 206, a fetch-decode unit 208, an instruction queue 210 and a dispatch unit 212. In one example, the instructions are loaded in L1 I-cache 206 of ISL 204, and they are retained in L1 I-cache 206 until they are required, or replaced if they are not needed. Instructions are retrieved from L1 I-cache 206 and, in one embodiment, are grouped into instruction groups and decoded by fetch-decode unit 208. After decoding a current instruction, the current instruction is loaded into instruction queue 210. Dispatch unit 212 dispatches instructions from instruction queue 210 into register management unit 214, as well as completion unit 221. Completion unit 221 is coupled to general execution unit 224 and register management unit 214, and monitors when an issued instruction has completed.

When dispatch unit 212 dispatches a current instruction, unified main mapper 218 of register management unit 214 allocates and maps a destination logical register number to a physical register within physical register files 232a-232n that is not currently assigned to a logical register. The destination is said to be renamed to the designated physical register among physical register files 232a-232n. Unified main mapper 218 removes the assigned physical register from a list 219 of free physical registers stored within unified main mapper 218. Subsequent references to that destination logical register will point to the same physical register until fetch-decode unit 208 decodes another instruction that writes to the same logical register. Then, unified main mapper 218 renames the logical register to a different physical location selected from free list 219, and the mapper is updated to enter the new logical-to-physical register mapper data. When the logical-to-physical register mapper data is no longer needed, the physical registers of old mappings are returned to free list 219. If free physical register list 219 does not have enough physical registers, dispatch unit 212 suspends instruction dispatch until the needed physical registers become available.

After the register management unit 214 has mapped the current instruction, issue queue 222 issues the current instruction to general execution engine 224, which includes execution units (EUs) 230a-230n. Execution units 230a-230n are of various types, including, for instance, floating-point (FP), fixed-point (FX), and load/store (LS). General execution engine 224 exchanges data with data memory (e.g., RAM 114, ROM 116 of FIG. 1) via a data cache 234. Moreover, issue queue 222 may contain instructions of floating point type or fixed-point type, and/or load/store instructions. However, it should be appreciated that any number and types of instructions can be used. During execution, EUs 230a-230n obtain the source operand values from physical locations in register files 232a-232n and store result data, if any, in register files 232a-232n and/or data cache 234.

Register management unit 214 includes, for instance: (i) mapper cluster 215, which includes architected register mapper 216, unified main mapper 218, and intermediate register mapper 220; and (ii) issue queue 222. Mapper cluster 215 tracks the physical registers assigned to the logical registers of various instructions. In one embodiment, architected register mapper 216 has 16 logical (i.e., not physically mapped) registers of each type that store the last, valid (i.e., checkpointed) state of logical-to-physical register mapper data. However, it should be recognized that different processor architectures can have more or less logical registers than described in this embodiment. Further, architected register mapper 216 includes a pointer list that identifies a physical register which describes the checkpointed state. Physical register files 232a-232n typically contain more registers than the number of entries in architected register mapper 216. It should be noted that the particular number of physical and logical registers that are used in a renaming mapping scheme can vary.

In contrast, unified main mapper 218 is typically larger (typically contains up to 20 entries) than architected register mapper 216. Unified main mapper 218 facilitates tracking of the transient state of logical-to-physical register mappings. The term "transient" refers to the fact that unified main mapper 218 keeps track of tentative logical-to-physical register mapping data as the instructions are executed out-of-order (OoO). Out-of-order execution typically occurs when there are older instructions which would take longer (i.e., make use of more clock cycles) to execute than newer instructions in the pipeline. However, should an out-of-order instruction's executed result require that it be flushed for a particular reason (e.g., a branch miss-prediction), the processor can revert to the checkpointed state maintained by architected register mapper 216 and resume execution from the last, valid state.

Unified main mapper 218 makes the association between physical registers in physical register files 232a-232n and architected register mapper 216. The qualifying term "unified" refers to the fact that unified main mapper 218 obviates the complexity of custom-designing a dedicated mapper for each of register files 232 (e.g., general-purpose registers (GPRs), floating-point registers (FPRs), fixed-point registers (FXPs), exception registers (XERs), condition registers (CRs), etc.).

In addition to creating a transient, logical-to-physical register mapper entry of an out-of-order instruction, unified main mapper 218 also keeps track of dependency data (i.e., instructions that are dependent upon the finishing of an older instruction in the pipeline), which is used for instruction ordering. Conventionally, once unified main mapper 218 has entered an instruction's logical-to-physical register translation, the instruction passes to issue queue 222. Issue queue 222 serves as the gatekeeper before the instruction is issued to execution unit 230 for execution. As a general rule, an instruction cannot leave issue queue 222 if it depends upon an older instruction to finish. For this reason, unified main mapper 218 tracks dependency data by storing the issue queue position data for each instruction that is mapped. Once the instruction has been executed by general execution engine 224, the instruction is said to have "finished" and is retired from issue queue 222.

Register management unit 214 may receive multiple instructions from dispatch unit 212 in a single cycle so as to maintain a filled, single issue pipeline. The dispatching of instructions is limited by the number of available entries in unified main mapper 218. In some mapper systems, which lack intermediate register mapper 220, if unified main mapper 218 has a total of 20 mapper entries, there is a maximum of 20 instructions that can be in flight (i.e., not checkpointed) at once. Thus, dispatch unit 212 can conceivably dispatch more instructions than what can actually be retired from unified main mapper 218. The reason for this bottleneck at the unified main mapper 218 is due to the fact that, conventionally, an instruction's mapper entry could not retire from unified main mapper 218 until the instruction "completed" (i.e., all older instructions have "finished" executing).

However, in one embodiment, intermediate register mapper 220 serves as a non-timing-critical register for which a "finished," but "incomplete" instruction from unified main mapper 218 could retire to (i.e., removed from unified main mapper 218) in advance of the instruction's eventual completion. Once the instruction "completes," completion unit 221 notifies intermediate register mapper 220 of the completion. The mapper entry in intermediate register mapper 220 can then update the architected coherent state of architected register mapper 216 by replacing the corresponding entry that was presently stored in architected register mapper 216.

Further details regarding one embodiment of the mappers and processing associated therewith are described in U.S. Publication Number 2013/0086361, entitled "Scalable Decode-Time Instruction Sequence Optimization of Dependent Instructions, Gschwind et al., published Apr. 4, 2013, which is hereby incorporated herein by reference in its entirety.

Figure 3:
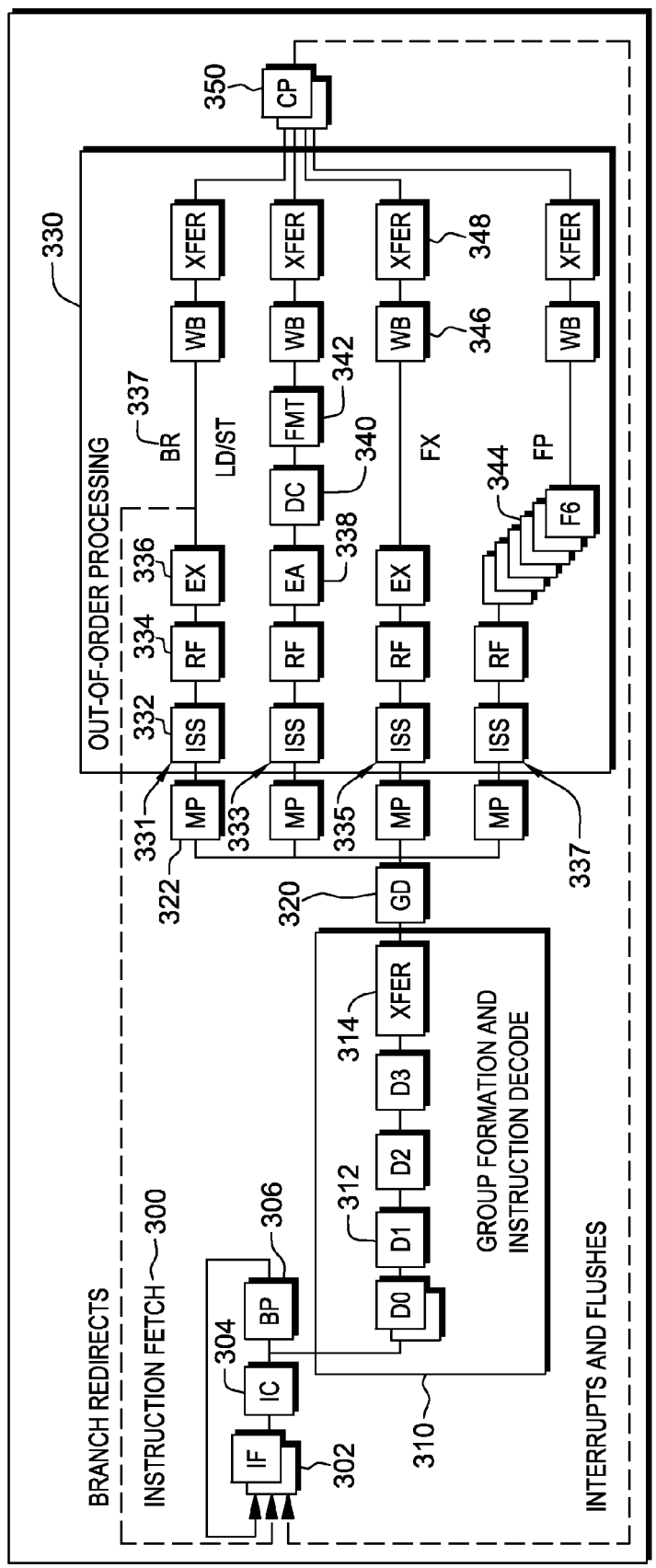
FIG. 3 depicts one embodiment of an instruction pipeline of a processor of a processing environment.

As referenced above, processor 200 employs pipelined processing to execute the instructions fetched from memory. Further details regarding one embodiment of this processing are described with reference to FIG. 3, which depicts one example of a processor pipeline. In one example, instructions are fetched into an instruction fetch unit 300, which includes, for instance, an instruction fetch (IF) 302, an instruction cache (IC) 304 and a branch predictor 306. Instruction fetch unit 300 is coupled to a group formation and decode unit 310, which includes one or more decode stages (Dn) 312, as well as a transfer stage (Xfer) 314 to transfer the decoded instructions to group dispatch (GD) 320. Group dispatch 320 is coupled to mapping units (MP) 322 (such as architected register mapper 216, unified main mapper 218, and/or intermediate register mapper 220 of FIG. 2), which are coupled to a processing unit 330.

Processing unit 330 provides processing for different types of instructions. For example, at 331, processing for an instruction that includes a branch redirect (BR) 337 is depicted, and includes, for instance, instruction issue (ISS) 332, register file read (RF) 334, execute (EX) 336, branch redirect 337 to instruction fetch 302, write back (WB) 346, and transfer (Xfer) 348; at 333, processing for a load/store instruction is depicted that includes, for instance, instruction issue 332, register file read 334, compute address (EA) 338, data cache (DC) 340, format (FMT) 342, write back 346, and transfer 348; at 335, processing for a fixed-point instruction is depicted, and includes, for instance, instruction issue 332, register file read 334, execute 336, write back 346, and transfer 348; and at 337, processing for a floating point instruction is depicted that includes, for instance, instruction issue 332, register file read 334, six cycle floating point unit (F6) 344, write back 346, and transfer 348. Processing for each type of instruction transfers to group commit (CP) 350. The output of group commit 350 is coupled to instruction fetch 302, in the case of interrupts and flushes, as examples.

Figure 4A:
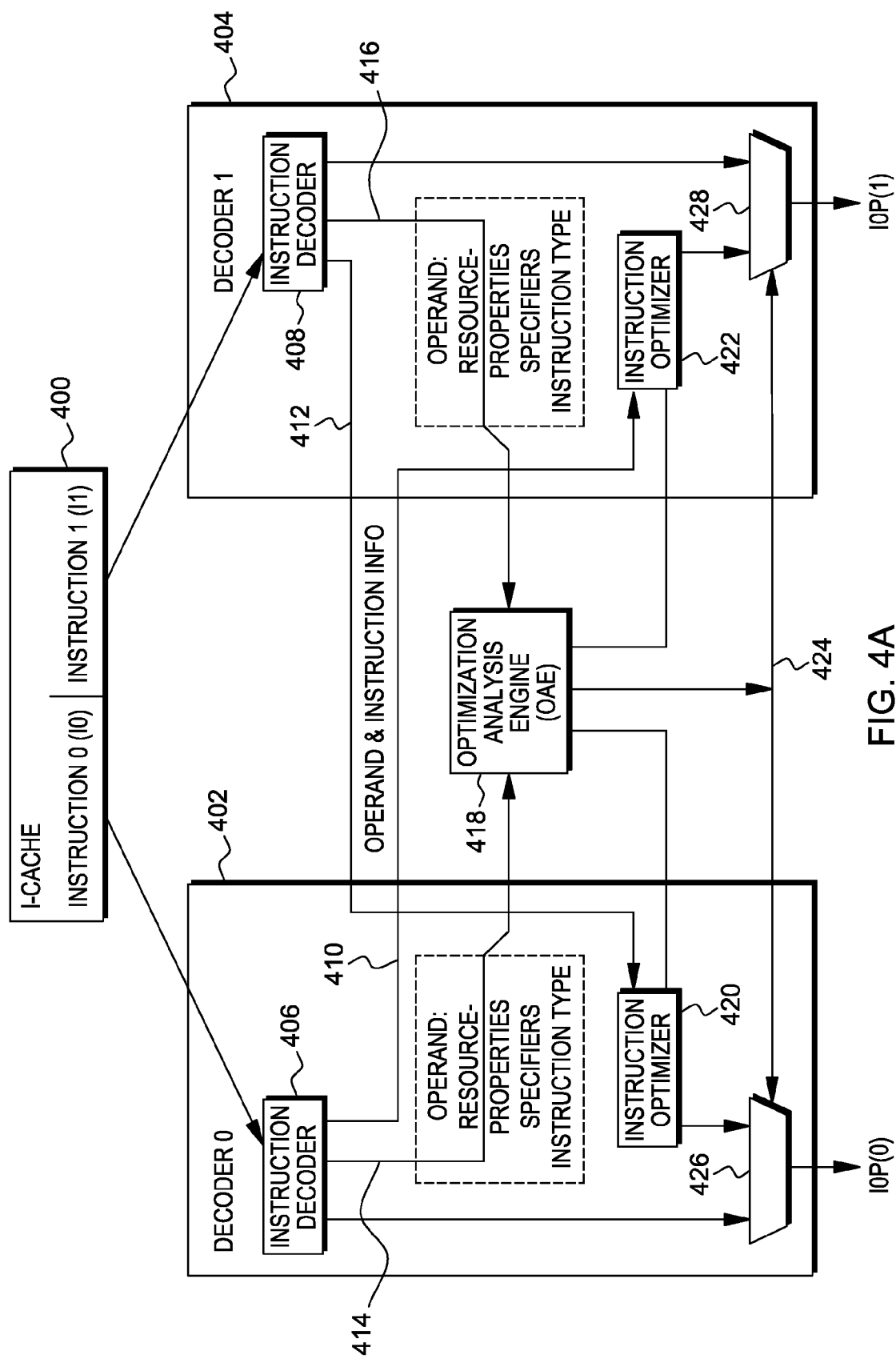
FIG. 4A depicts one embodiment of decoders used to decode instructions and provide optimizations.

Further details regarding one embodiment of group formation and decode unit 310 are described with reference to FIGS. 4A-4C. Referring to FIG. 4A, in one embodiment, a plurality of decoders 402, 404, such as Decoder 0 and Decoder 1, respectively, is coupled to an instruction cache 400 that includes a plurality of instructions. In one example, decoder 402 receives a first instruction 0 (I0) from instruction cache 400 and decoder 404 receives a second instruction 1 (I1) from the cache. Each decoder includes an instruction decoder 406, 408, respectively, to perform initial decoding of the instructions and to provide information 410, 412, 414 and 416 about the decoding. For instance, information 414 and 416 are provided to an optimization analysis engine (OAE) 418; and information 410 and 412 are provided to instruction optimizers 422, 420, respectively.

In an embodiment, optimization analysis engine 418 compares the decoded characteristics of the instructions in decoders 402 and 404 to determine whether they correspond to one of a plurality of compound sequences that are candidates for optimization. Further, optimization analysis engine 418 is responsive to a plurality of control signals to suppress the recognition of compound sequences, e.g., when a configuration bit is set. Configuration bits can correspond to implementation specific registers to disable decode time instruction optimization (DTIO) for all or a subset of compound instructions when a design error has been detected, when a determination has been made that performing a DTIO sequence is no longer advantageous, when a processor enters single-instruction (tracing) mode, and so forth. Optimization analysis engine 418 can be a single entity as shown in FIG. 4A, or can be replicated, distributed, split or otherwise integrated into one or more of decoders 402 and 404. The optimization analysis engine can be combined in a single large compound decoder (e.g., including, but not limited to, a complex decoder comprising optimization analysis engine 418, decoder 402 and decoder 404 in a single structure), to facilitate logic optimization of circuit design improvements.

The optimization analysis engine provides information indicating whether a compound sequence, which can be optimized, has been detected, as well as information about the nature of the sequence (e.g., which of a plurality of instructions, and/or specific properties of the sequence to be used by the decoder optimization logic to generate an optimized sequence). OAE also provides steering logic to a selector to select one of an unoptimized internal operation (iop) generated by the initial decode operation, or an iop corresponding to an iop in an optimized DTIO sequence. The iop in the optimized sequence has been generated by, for instance, optimization logic under control of the OAE control signals, and based on additional information received from decoders having decoded a portion of a compound sequence being optimized, such as register specifiers, immediate fields and operation codes, for example.

Optimization analysis engine 418 is coupled to instruction optimizer 420 and instruction optimizer 422. Instruction optimizer 420 receives operand and instruction information from instruction decoder 408, and instruction optimizer 422 receives operand and instruction information from instruction decoder 406.

Additionally, instruction optimizer 420 and instruction decoder 406 are coupled to selection logic 426, and instruction optimizer 422 and instruction decoder 408 are coupled to selection logic 428. Optimization analysis engine 418 may provide selection information 424 to selection logic 426, 428 for determining if the respective instructions I0 or I1 should generate respective iop instructions (iop(0), iop(1)), or if an optimized instruction should be used.

Further details of one embodiment of an optimizer 420 (or optimizer 422) is described with reference to FIG. 4B. A first instruction 450 and a next sequential instruction 452 are determined to be candidates for optimization 454. The first instruction 450 includes an opcode (OP1), a source register field (RA1), an immediate field (I1), and a result target field (RT1). The next sequential instruction 452 includes an opcode (OP2), a source register field (RA2), an immediate field (I2), and a result target field (RT2). If they are not optimizable according to a predefined optimization criterion, they are executed in order (OP1 456 then OP2 458). If, however, they meet the criterion (including, e.g., that RT1=RA2), the next sequential instruction is modified by optimizer 420 to include a concatenated value of I1 and I2 to provide a new next sequential instruction 462 that can be executed out-of-order relative to the first instruction 460. In one embodiment, the modified next sequential instruction has a new effective opcode (OP2x).

Another embodiment of an optimizer 420 (or optimizer 422) is depicted in FIG. 4C. In this example, a first instruction 470 and a next sequential instruction 472 are determined to be candidates for optimization 474. The first instruction 470 includes an opcode (OP1), a source register field (RA1), another source register field (RB1), and a result target field (RT1). The next sequential instruction 472 includes an opcode field (OP2), a source register field (RA2), another source register field (RB2), and a result target field (RT2). If they are not optimizable according to the predefined optimization criterion, they are executed in order (OP1 480 then OP2 482). If, however, they meet the criterion (including, e.g., that RT1=RA2), the next sequential instruction is modified by optimizer 420 to include RB1 to produce a new next sequential instruction 478 that can be executed out-of-order relative to the first instruction 476. In one embodiment, the modified next sequential instruction has a new effective opcode (OP2x).

As described herein, one form of optimization is decode time instruction optimization in which instructions in a group of instructions are optimized at decode time or pre-decode time (both of which are referred to herein as decode time). A group of instructions includes one or more instructions, and in the embodiments described herein, a group includes up to four instructions. However, in other embodiments, a group may include more or less instructions than the examples described herein.

One embodiment of the logic to form a group of instructions is described with reference to FIG. 5. Referring to FIG. 5, in one embodiment, a new empty group is started, STEP 500. Then, a fetched instruction is added to the instruction group, STEP 502, and a determination is made as to whether there are more instruction slots in the group, INQUIRY 504. If there are more instruction slots in the group (e.g., less than 4 instructions have been added thus far), then processing continues with adding an instruction to the instruction group, STEP 502. However, if there are no more instruction slots in the group, then the instruction group is sent through the pipeline for further processing, STEP 506. Additionally, a determination is made as to whether there are more instructions to be processed, INQUIRY 508. If there are more instructions, then processing continues with STEP 500. Otherwise, group formation is complete.

The formation of groups, referred to as group formation or decode group formation, has previously limited the ability to optimize instructions when the instructions to be optimized span multiple instruction groups. For instance, assume that an add immediate shift (addis) instruction is typically optimized with a load instruction (ld). If, as shown in FIG. 6, the addis instruction is in Group 1 and the load instruction is in Group 2, the instructions are not optimized, in this embodiment, since they are in different groups. Thus, even though based on one optimization criterion, when an add immediate shift (addis) instruction is followed by a load (ld) instruction, optimization is to be performed, in this scenario, it is not, since the instructions are in different instruction groups.

However, in accordance with one aspect, optimization, such as decode time instruction optimization, is provided across instruction groups. For instance, a processor forms instruction groups adaptively which can span multiple groups. Instruction sequences spanning multiple groups are optimized by retaining information, such as information relating to an instruction at the end of a group to be co-optimized with an instruction at the beginning of a subsequent group. As one particular example, a first set of instructions corresponding to the beginning of an instruction sequence are in a first group, and the instructions are optimized and injected into the processor. Information about the initial instructions in the instruction sequence is retained. The retained instruction information is then used to co-optimize with even more instructions in a second group. The retained information includes, for instance, microarchitecture pointers, register numbers, and/or table references (e.g., to an index in a 32 bit displacement table), as examples.

In one embodiment, the processing environment is a multi-threaded environment, and thus, instructions are associated with threads. In such an environment, optimization is performed across groups if the instructions are associated with the same thread. This is pictorially depicted in FIGS. 7A-7B.

Figure 7A:
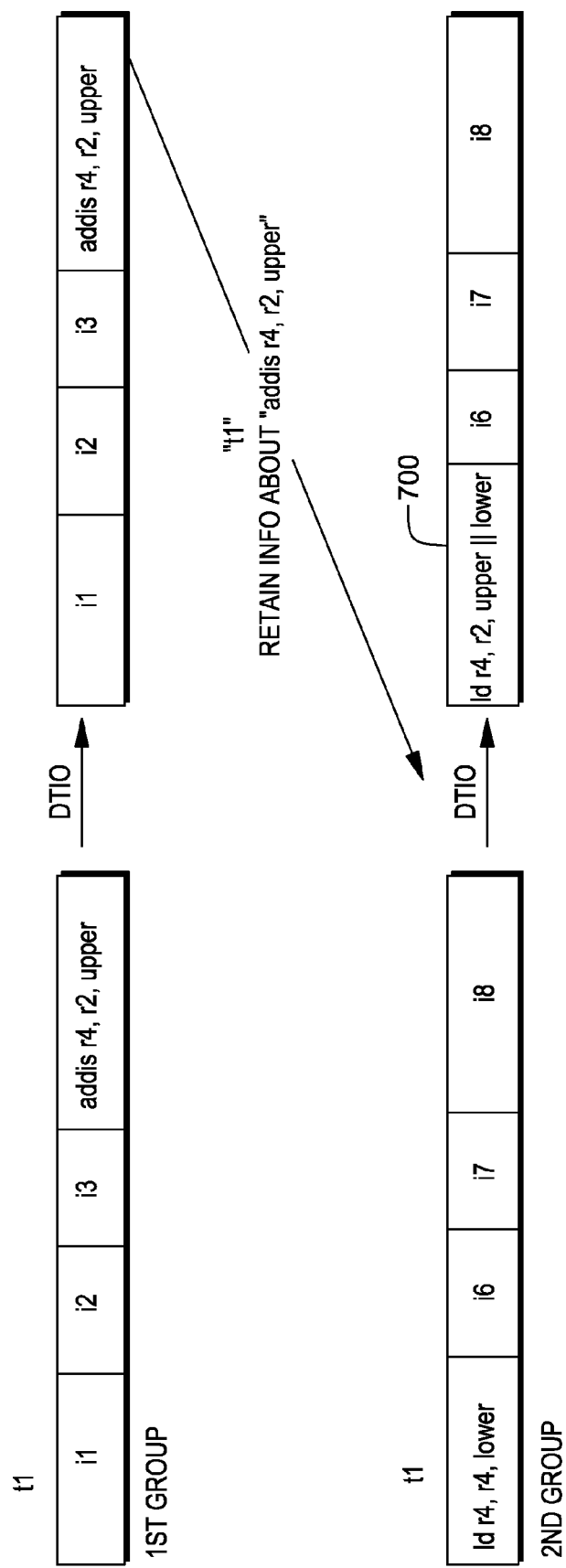
FIG. 7A pictorially depicts one example of providing optimization across instruction groups.
Figure 7B:
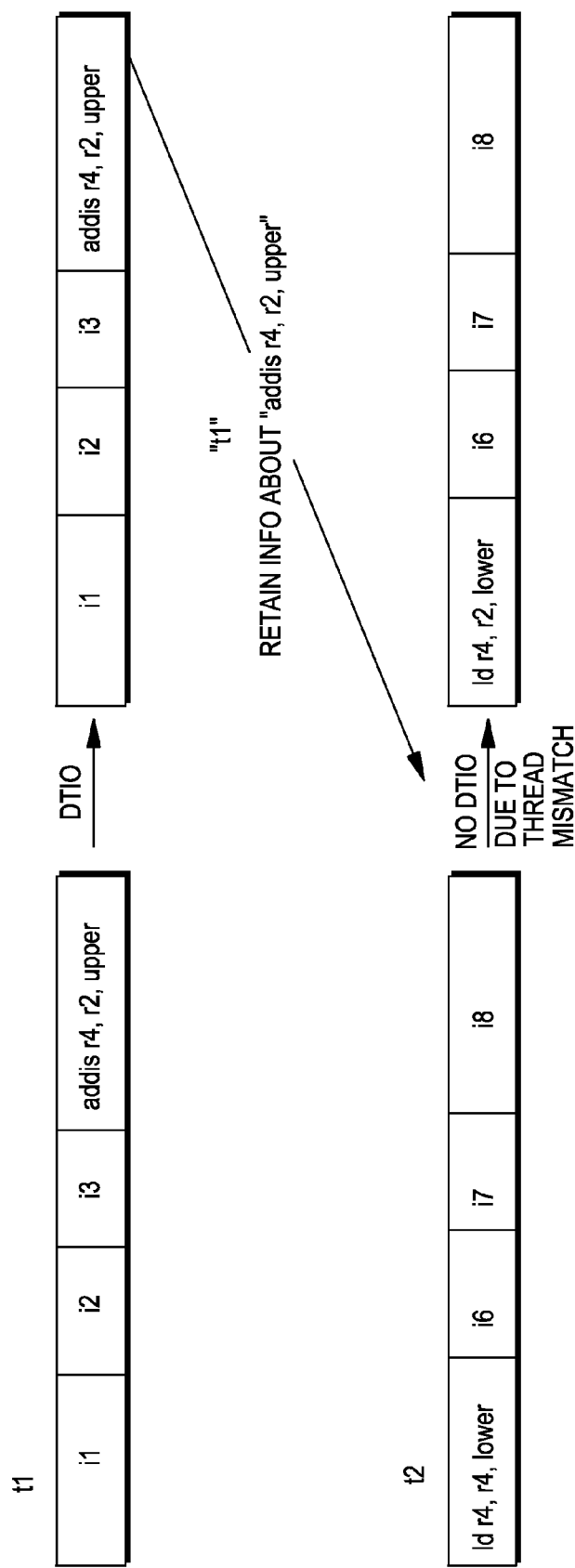
FIG. 7B pictorially depicts one example of not permitting optimization across instruction groups.

Referring to FIG. 7A, at thread t1, there is a first group that includes instructions i1, i2, i3 and an add immediate shift (addis) instruction. Optimization, such as decode time instruction optimization, is (or may be) performed within the group, which in this case yields the same group with the same instructions. Further, in this instance, information is retained about the add immediate shift instruction to enable the possibility of further optimization with instructions in another group.

In this example, a second group includes a load (ld) instruction, as well as instructions i6-i8. The retained information is used to co-optimize the add immediate shift and the load instructions as shown at 700 in the second decode group. For instance, in this example, the ld instruction is made independent of the addis instruction by way of the retained information, and the dependence on register r4 with a displacement consisting of "lower" bits is replaced with a dependence on register r2 and a combination of "upper" bits retained from a first instruction in a previous group and the "lower" bits contained in the ld instruction. With reference to the combined displacement, "upper||lower" represents a shorthand of the combination of upper and lower bits, taking into account any adjustments for implied sign extension of the "lower" displacement in accordance with the definition of the ld instruction in the Power ISA.

As indicated above, in one embodiment, in order to optimize across decode groups, the instructions are to be within the same thread. Thus, in the example shown in FIG. 7B, information regarding the add immediate shift instruction may be retained, but there is no co-optimization with the load instruction, since the load instruction is from a different thread (e.g., thread 2). In a further embodiment, information regarding the add immediate shift instruction is not retained, since it is determined that the load instruction is associated with a different thread.

Figure 8A:
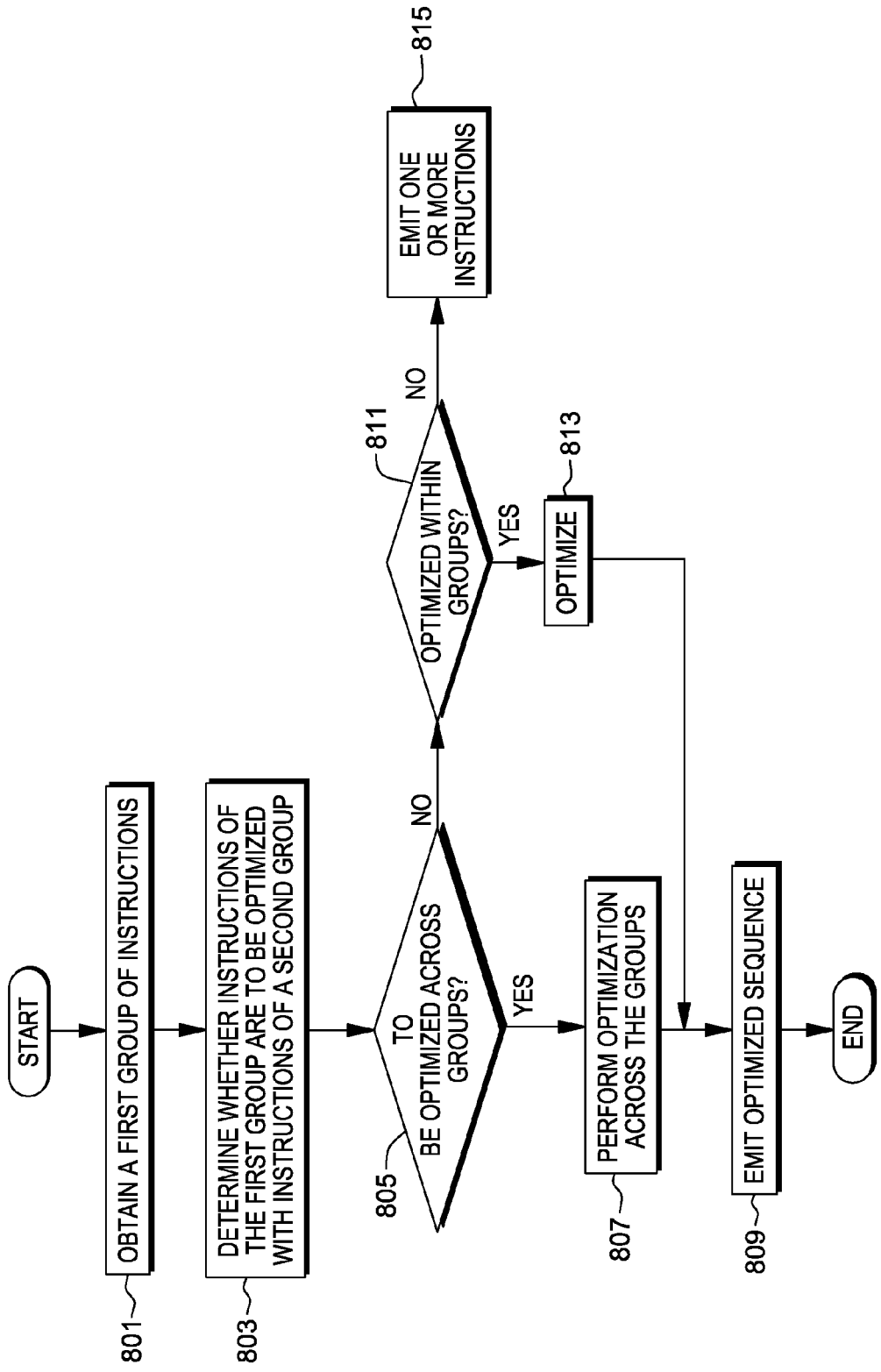
FIG. 8A depicts one embodiment of logic to optimize across instruction groups.

One embodiment of an overview of the logic associated with performing optimization across multiple instruction groups is described with reference to FIG. 8A. Initially, a first group of instructions is obtained, STEP 801. Then, a determination is made as to whether one or more of the instructions of the first group of instructions are to be optimized with one or more instructions of a second group of instructions, STEP 803. If one or more of the instructions of the first group are to be optimized with one or more instructions of the second group, INQUIRY 805, then optimization is performed across the groups, as described herein, STEP 807. Thereafter, the optimized sequence is emitted (e.g., decoded and forwarded on in the instruction stream), STEP 809.

Returning to INQUIRY 805, if optimization is not to be performed across the groups, then a determination is made as to whether optimization is to be performed within the first group (or even the second group), INQUIRY 811. If optimization is to be performed within a group, then instructions within the group are optimized, STEP 813, and the optimized sequence is emitted, STEP 809. However, if optimization is not to be performed within a group, then one or more of the received instructions are emitted, STEP 815.

Figure 8B:
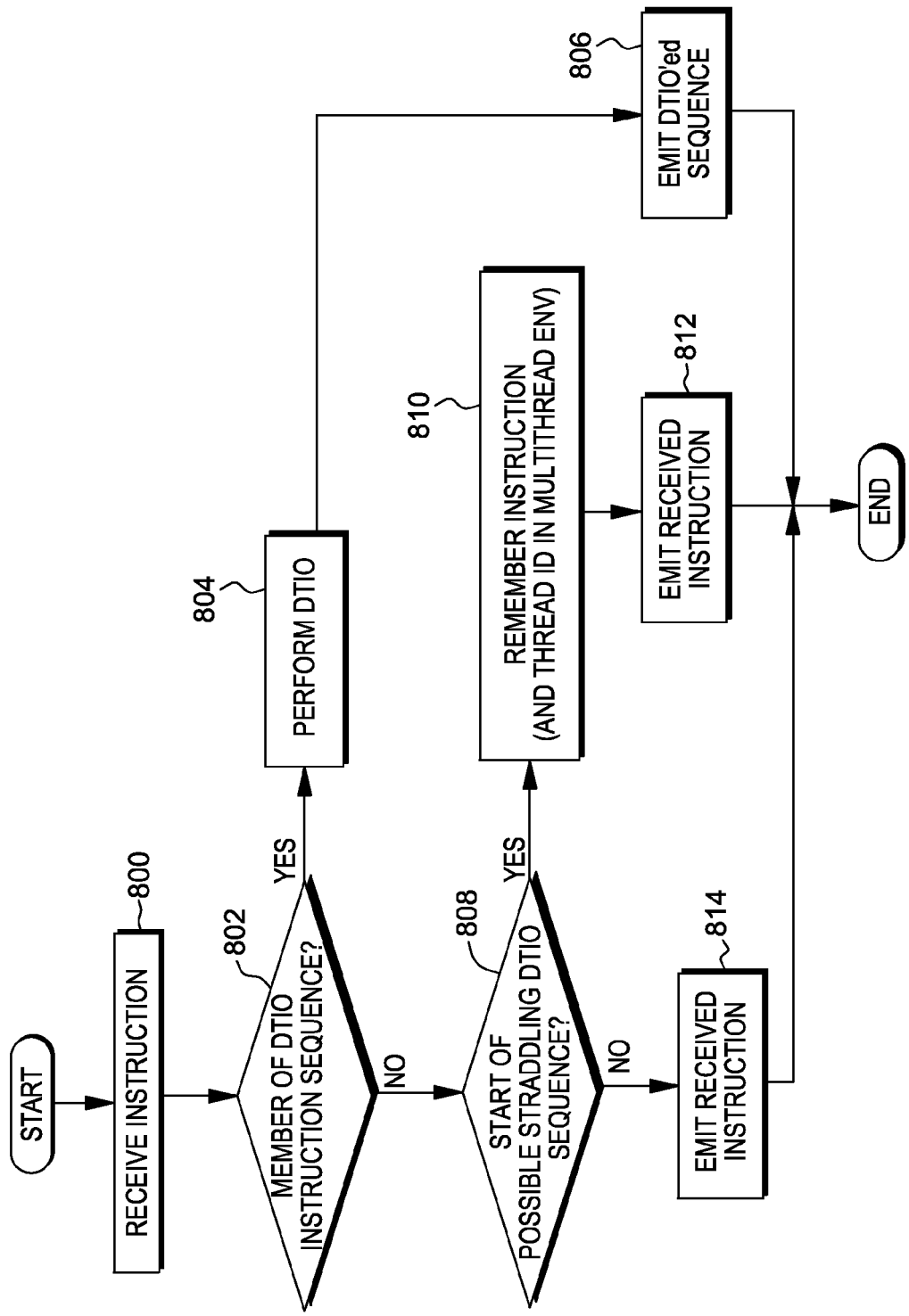
FIGS. 8B-8C depict other embodiments of logic to perform optimizations across instruction groups.

Further details regarding spanning multiple instruction groups to perform optimization are described with reference to FIG. 8B. Initially, in one embodiment, an instruction is received, STEP 800, and a determination is made as to whether the instruction is a member of a contained optimization instruction sequence (e.g., the sequence is within one group), INQUIRY 802. For instance, the instruction group is examined to see if the group includes all the instructions that are to be optimized with one another, as determined based on, for instance, predefined criteria, saved information, and/or parameters relating to the instructions, as examples. If the instruction is a member of a contained optimization instruction sequence, then optimization is performed (e.g., DTIO), STEP 804. Optimization improves code execution by, for instance, combining multiple instructions into a single internal instruction; recombining multiple instructions into multiple/fewer internal instructions; recombining multiple instructions into multiple internal instructions, with fewer data dependencies; and/or recombining multiple instructions into multiple internal instructions that are otherwise easier/faster to execute. In one embodiment, templates are provided that specify how particular instructions are optimized. Further, other information is used to provide general guidance for performing optimization.

Subsequent to performing optimization, the optimized sequence is emitted, STEP 806.

Returning to INQUIRY 802, if the received instruction is not a member of a contained optimization instruction sequence, then a further determination is made as to whether the instruction is the start of a possible straddling optimization sequence, INQUIRY 808. For instance, is it the last instruction in the group and of a type to be co-optimized (e.g., an addis instruction). The types of instructions to be co-optimized may be indicated in, for instance, templates, predefined criteria, data structures, and/or determined based on parameters. If the instruction is the start of a straddling sequence (i.e., one that spans multiple groups), then information regarding the instruction is retained, including, for instance, a thread id of the thread executing the instruction, if it is a multithreaded environment, STEP 810. Then, the received instruction is emitted, STEP 812.

Returning to INQUIRY 808, if the instruction is not the start of a possible straddling of an optimization sequence, then the received instruction is emitted, STEP 814.

Figure 8C:
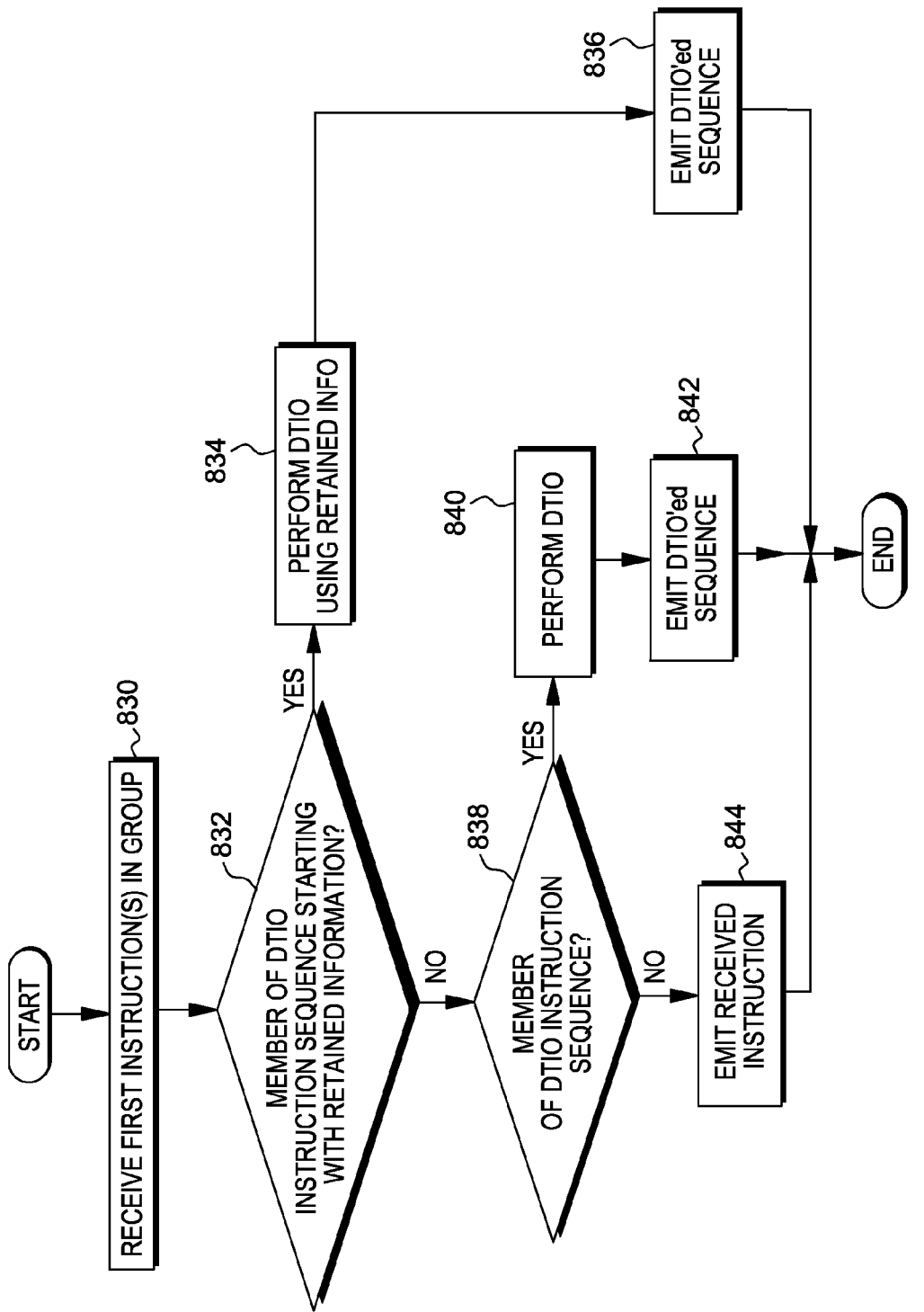

Further details of using the retained information to perform optimization are described with reference to FIG. 8C. Initially, one or more instructions in a group of instructions (e.g., a second group or even a later group) are received, STEP 830, and a determination is made as to whether the received instruction(s) is (are) a member of an optimizable instruction sequence with retained information, INQUIRY 832. That is, is the received instruction in this subsequent group optimizable with an instruction from a previous group for which information is retained. In a multi-threaded processor, this decision also takes into account, in one embodiment, whether the instructions to be co-optimized are from the same thread, as described above with reference to FIGS. 7A-7B and with reference to the thread id of STEP 810.

If the received instruction is a member of an optimizable sequence with retained information, then optimization is performed for the instructions of the two (or more groups) using the retained information, STEP 834, and the optimized sequence is emitted, STEP 836.

Returning to INQUIRY 832, if the instruction is not a member of an optimizable instruction sequence with retained information, then a further determination is made as to whether it is part of a contained optimization instruction sequence (e.g., in the same group), INQUIRY 838. If so, then optimization is performed within the group, STEP 840, and that optimized sequence is emitted, STEP 842.

Returning to INQUIRY 838, if the instruction is not a member of a contained optimization instruction sequence, then the received instruction is emitted, STEP 844.

Described in detail herein is one aspect of performing optimization across instruction group boundaries. In a further embodiment, optimization is performed within a group, and/or across groups. One embodiment of the logic associated with performing optimizations within a group, as well as performing optimizations across groups is described with reference to FIG. 9A.

Figure 9A:
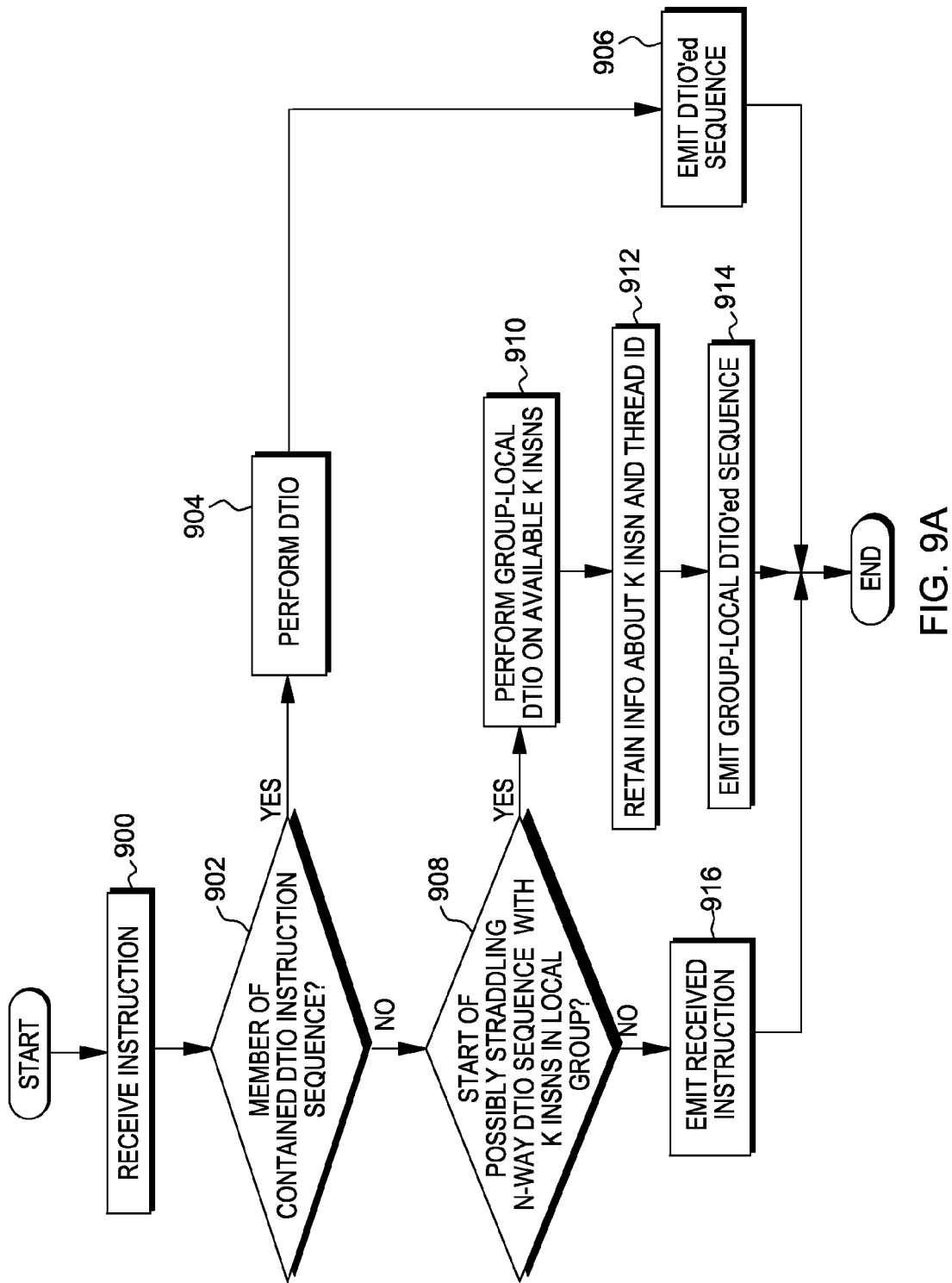
FIGS. 9A-9B depict embodiments of logic to perform optimizations within an instruction group and across instruction groups.

Referring to FIG. 9A, initially, an instruction is received, STEP 900, and a determination is made as to whether the instruction is a member of a contained optimization instruction sequence, INQUIRY 902. If the instruction is a member of a contained optimization instruction sequence, then optimization is performed within the group, STEP 904, and the optimized sequence is emitted, STEP 906.

Returning to INQUIRY 902, if the instruction is not a member of a contained optimization instruction sequence, then a further determination is made as to whether it is the start of a possibly straddling n-way (e.g., 2 or more) optimization sequence with k instructions in a local group (e.g., one particular group), INQUIRY 908. If the instruction is the start of a possibly straddling optimization sequence, then optimization is performed on the available k instructions in the one group, STEP 910, and information regarding those k instructions, along with the thread id (if applicable), is retained, STEP 912. Then, the local optimized sequence is emitted, STEP 914.

Returning to INQUIRY 908, if the instruction is not the start of a possibly straddling n-way optimization sequence, then the received instruction is emitted, STEP 916.

Figure 9B:
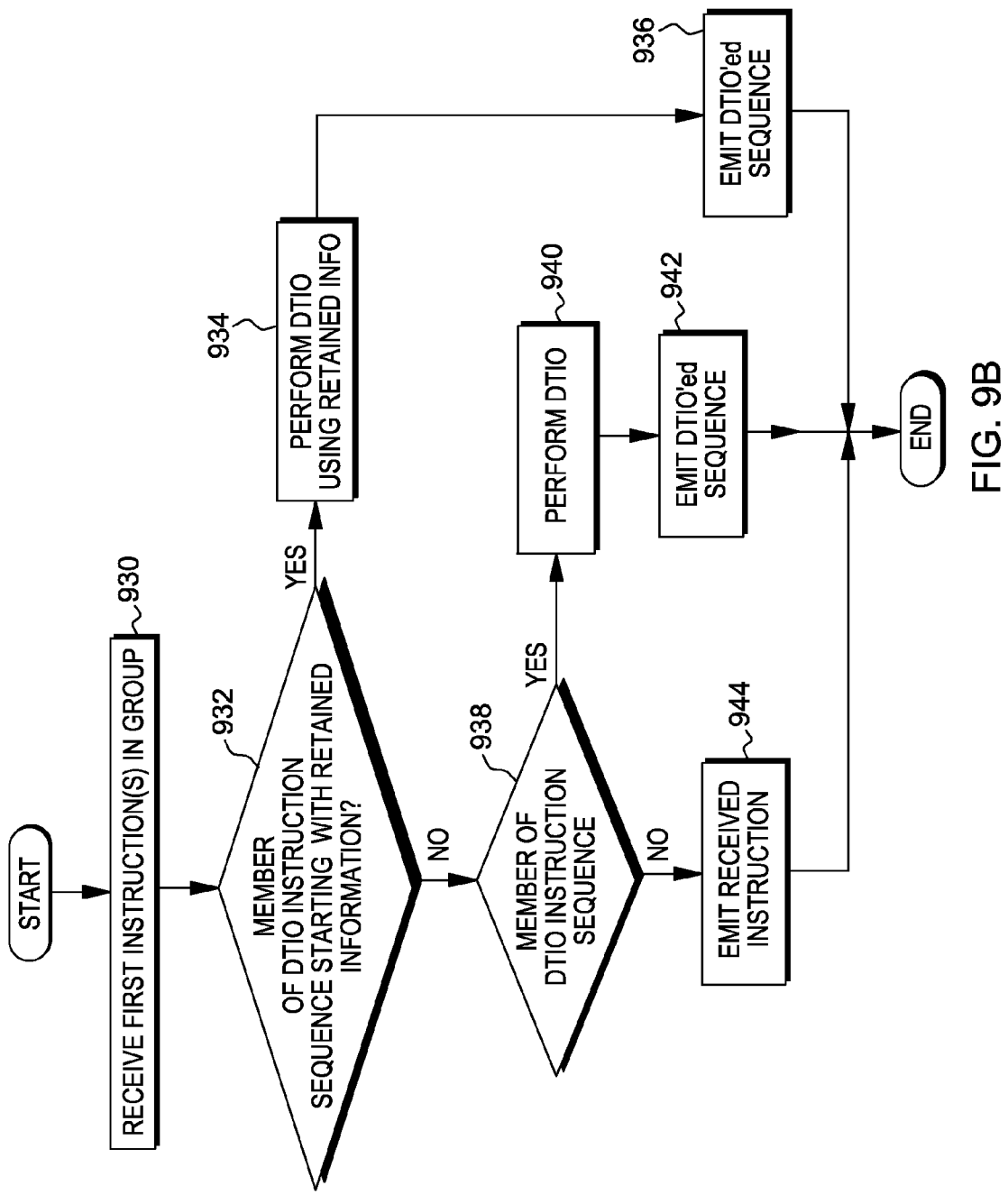

The use of the retained information is further described with reference to FIG. 9B. Initially, one or more instructions in a subsequent group are received, STEP 930. A determination is made as to whether the instruction(s) is (are) a member of an optimized instruction sequence starting with the retained information, INQUIRY 932. If so, then optimization is performed using the retained information, STEP 934, and the optimized sequence (which includes instructions across two or more groups) is emitted, STEP 936. In one embodiment, the retained information includes a thread id which is used, as described herein.

Returning to INQUIRY 932, if the instruction is not a member of the optimization instruction sequence with retained information, then a further determination is made as to whether it is a member of a contained optimization instruction sequence, INQUIRY 938. If so, then optimization is performed, STEP 940, and the optimized sequence is emitted, STEP 942. Otherwise, the received instruction is emitted, STEP 944.

In performing optimization across instruction groups, it is possible that a different instruction sequence for a straddling case is generated compared to the instruction sequence for a non-straddling case. For example, assume a first group includes an add immediate shift instruction (e.g., addis r4, r2, upper), and a second group includes a load instruction (e.g., ld r4, r4, lower), then for the non-straddling case, the instructions are optimized to, for instance, one instruction: ld r4, r2, upper∥lower; but for the straddle case, the instructions are optimized to two instructions: addis r4, r2 upper; ld r4, r2, lower∥upper. In the latter case, the load is optimized since it does not have to wait for the first addis to complete and produce r4. Rather, it can immediately read r2 to execute concurrently and even before the addis instruction.

Further, in one embodiment, as indicated above, the retained information is associated with a thread id to avoid false optimization across two different threads. In one embodiment, one set of information is retained per thread, or in a further embodiment, there may be k sets of information retained for each thread. If there is an exception or other control flow change, then a flush of retained information is performed for the thread associated with the flush. In another embodiment, the retained information is flushed when a fetch/decode alternates across threads to avoid incorrect co-optimization across threads.

As described above, an optimization candidate sequence can be completely contained in one instruction group; can start in a first instruction group and can be completed in a second instruction group; or it can start in a first instruction group, continue in a second instruction group and complete in yet another group. In one embodiment, the detection and processing of candidate sequences, including performing optimization, follow one or more templates. If there are multiple templates that can be applied, then the templates are prioritized.

A template is identified by a number of instructions that are to be present in the instruction stream. A template may include an input, a condition, and/or an output. The input is a sequence of instructions that are to be present. In one embodiment, the instructions to be optimized by a template are adjacent, i.e., without intervening instructions; however, in another embodiment, intervening instructions that do not reference or interfere with the operands of the template sequence are included. Instruction opcodes and formats are to match those of the specified instructions. There are relationships of operands, such that all like-named operands are to match (e.g., if operand <R1> occurs in several locations of a template, all associated operand fields are to match the same). Variables indicated by literals (i.e., a value directly represented, e.g., as a register number, a numeric value, or other directly specified operand) are to have the value indicated by the literal represented directly in the instruction.

Optionally, a template condition that specifies a condition to be met may be provided. Example conditions include that a constant specified by an instruction is to be a positive, or registers are to be paired, etc. for a template to be applicable.

The template output specifies an optimized output sequence that includes one or more internal instructions, referred to as internal operations (iops), and operands. They can specify operand fields from the template; functions to generate new fields, values, etc. as appropriate; and/or can specify values to be retained in a conjunction with a continuation sequence number.

Generally, in one embodiment, the optimization of candidate sequences that are represented by templates may have a particular syntax. For instance, for optimizations for one group, if instruction 1 equals instruction one of a first candidate sequence (i1=cs1.i1) and instruction two equals instruction two of the first candidate sequence (i2=cs1.i1) and there are relationships between a source (src(i2)) and a destination (dst(i1)), then the optimization sequence is equal to the optimization for the first candidate sequence with instructions i1 and i2. If this is not true, then internal instruction 1 is the decode of i1, and internal instruction 2 is the decode of i2. This is shown, as follows:

```
If (i1=cs1.i1) and (i2=cs1.i2) and src (i2) = dst (i1) then
    iop_sequence = perform_cs1_dtio (i1,i2)
Else
    iop1=decode (i1)
    iop2=decode (i2).
```

One specific template example in which two 16 bit immediate fields are combined into a single 32 bit immediate field by concatenating and taking into account the implicit sign extension performed by an add immediate shift (addis) instruction/add immediate (addi) instruction on displacement is as follows:

```
Template: (destructive (i.e., overwriting) addis/addi sequence)
    i1 = addis <r1>, <r2>, <upper>
    12 = addi <r1>, <r2>, <lower>
=> optimization:
    addi32 <r1>, <r2>, combine(<upper>,<lower>)
```

Templates can be translated to VHDL (Very high speed integrated circuits Hardware Description Language) code, either manually or by a tool. The code is to match the instructions of the template(s); match dependency/operand reuse relationships; and/or generate associated outputs.

One example of VHDL code for the above template is:

```
IF opcode (i1) = OP_ADDIS AND RT(i1) = RT(i2) AND RT(i1) =
RS1(i2) AND opcode(i2) = ADDI THEN
    i1out_op <= IOP_ADDI32;
    i1out_rt <= RT(i1);
    i1out_rs1 <= RS1(i1);
    i1out_imm <= combine (si16(i1), si(i2));
    i2out_op <= IOP_NOP_ORI;
ELSIF opcode(i1) = ... -- other templates
...
ELSE
    i1out_op <= iop(opcode(i1));
    ...
    i2out_op <= iop(opcode(i2));
    ...
END IF
```

In at least one embodiment, a candidate sequence with x instructions has fewer instructions than a decode group with y instructions. Thus, in one embodiment, VHDL code can be automatically generated from a template where the same candidate sequence is detected and optimized at the first instruction, the second instruction, etc. up to the (y-x)th instruction.

In a further template example, more than one instruction may be outputted by the optimization, as shown below:

```
Template: (non-destructive addis/addi sequence)
    i1 = addis <r1>, <r2>, <upper>
    i2 = addi <r3>, <r1>, <lower>
=> optimization:
    addis <r1>, <r2>, <upper>
    addi32 <r3>, <r2>, combine(<upper>,<lower>)
```

This template combines two 16 bit immediate fields into a single 32 bit immediate field by concatenating and taking into account the implicit sign extension performed by addis/addi on displacement. This form generates an intermediate result for r1 because it is not overwritten (not destroyed) by the next instruction in the template. In one embodiment, templates have parallel semantics, and input logical registers are to be renamed without reference to any output rename registers allocated by rename logic for target registers.

Although in the examples above, two instruction sequences are shown, other sequences may include more than two instructions and still be included in the same decode group. One example of an n (e.g., 3) instruction candidate sequence includes, for instance: addpcis+r4, pc, upper; addi r4, r4, lower; and lvx* vr2, r0, r4. This sequence may be represented in the following template:

```
i1 = addpcis+ <r1>, <r2>, <upper>
i2 = addi <r1>, <r1>, <lower>
i3 = lvx* <vrt>, r0, <r1>
=> optimization:
    lvd <vrt>, pc_or_gpr(<r2>), combine (<upper>, <lower>)
```

The addpcis instruction is to provide program counter (PC) relative addressing in a particular architecture, such as the POWER ISA. The addpcis instruction is similar to addis, but introduces the value of the PC, rather than the constant 0, when the RA field has a value 0. The pc_or_gpr function handles expanding the PC special case, since the lvd case would otherwise handle the RA operand similar to all other RA operands as a 0 value representing 0, and the other register values representing that logical register. Lvd is not an architected instruction of, for instance, the POWER architecture, but it is used as an internal operation that describes a load instruction with an implementation defined displacement. In one example, lvx* is an instruction form that defines the base register (e.g., 4 in this example) as having an unspecified value after execution of the instruction. In one example, lvx* is a new form of the lvx instruction indicating a last use of at least one register (e.g., defined herein to be the register indicated as <r1> in the template).

In one embodiment, for a template with x+1 instructions, there are x possible locations to start a candidate sequence such that the candidate sequence is not contained in a single instruction group. Templates handling this scenario are described below.

For templates that span instruction groups, the template input further specifies an end of a decode group ($EODG), which indicates a point splitting a potentially longer candidate sequence by decode group boundary. In a further embodiment, it also includes a beginning of the decode group ($BODG (cont, <op1>, <op2>)). This indicates a template that is a continuation of a candidate sequence that was in a prior group. (Thread id match, or selection of one of a plurality of retained instruction information sets, corresponding to information retained for multiple threads concurrently, is implicit in the multithreaded processors.) Further, in this embodiment, the template output can specify values to be retained, and a continuation sequence number, such as $EODG (cont, <op1>, <op2>).

Candidate sequences that span multiple instruction groups use multiple templates, at least one describing a group of instructions on one side of an instruction group boundary, and at least one other template describing instructions at the other side of an instruction group boundary. It is noted that instructions corresponding to a sequence of instructions in a first instruction group that includes a set of n first instructions of an optimization candidate sequence with k instructions, k>n, that discovery of n instructions does not guarantee that the remaining instructions (i.e., the k-n instructions remaining from the candidate sequence) will follow. Thus, any sequence generated for the first k instructions is to represent correctly the execution of these k instructions, even if these k instructions are not the first k instructions of the n instruction sequence.

It follows that these k instructions might also be the start of a second optimization candidate sequence with m instructions. Since, in one embodiment, the k instructions are a representative of those k instructions in isolation, and since the same holds true for the second candidate sequence of m instructions (with m equal or not equal to k), two candidate sequences with a common first set of instructions in a first instruction group, and a second set of (at least) two different continuations is possible, e.g.: 3 candidate sequences with one common first instruction:

| | | |
|---|---|---|
| addis r3, r2, 12 | ld r3, r3, 8; | |
| addis r3, r2, 12 | lf f3, r3, 8; | |
| addis r3, r2, 12 | addi r3, r3, 8; | lvx v3, r0, r3; |

For 2-instruction optimization candidate sequences, the templates may be automatically generated. For two instruction candidate groups, the first instruction is necessarily on one side of an instruction group boundary, and the second instruction is necessarily on the other side of the group boundary. In the 1+1 split group of two instructions, the first instruction is represented by itself (one instruction can only be represented by itself); and the second instruction is represented by the same instruction(s) that would have represented the optimization group in a contained template.

One example of a template for a 32 bit addition for a first decode group (DG) is as follows:

```
Template 1st DG
    i1 = addis <r1>, <r2>, <upper>
    $EODG
    => optimization
        addis <r1>, <r2>, <upper>
        $EODG (addi32, <r1>, <r2>, <upper>)
```

The i1 instruction is translated by itself, and the r1 and r2 fields, the immediate filed identified by <upper>, and a marker indicating the addi32 template are preserved.

An example template for a 32 bit addition for a second decode group is as follows:

```
Template 2nd DG:
    $BODG (addi32, <r1>, <r2>, <upper>)
    i1 = addi <r1>, <r1>, <lower>
    => optimization:
        addi 32 <r1>, <r2>, combine(<upper>, <lower>)
```

The instruction in this template is labeled i1 because it is the first instruction of a second template. "Combine" combines two 16 bit immediate fields to a single 32 bit immediate field by concatenating and taking in account the implicit sign extension performed by addis/addi on displacement. It is assumed in this example that the instructions are associated with the same thread. (Translation of these templates to VHDL or other application of templates to instruction streams will be suitably adapted to provide this property, as described herein.)

N-instruction optimization candidate sequences can typically occur as either fully contained within a decode group, if the sequence is shorter than the decode group length, or with n−1 templates reflecting different points where the optimization sequence may be separated by the decode group boundary.

An example of an n instruction candidate sequence is described below. In this case, the n instructions are contained within one instruction group, and therefore, templates representative of one instruction group are used.

As one example, the three instruction sequence includes:

```
addpcis+ r4, pc, upper
addi r4, r4, lower
lvx* vr2, r0, r4
```

An example template is as follows:

```
i1 = addpcis + <r1>, <r2>, <upper>
i2 = addi <r1>, <r1>, <lower>
i3 = lvx* <vrt>, r0, <r1>
=> optimization
    lvd      <vrt>, pc_or_gpr(<r2>), combine (<upper>,<lower>)
```

The addpcis instruction is to provide program counter (PC) relative addressing in a particular architecture, such as the POWER ISA. The addpcis instruction is similar to addis, but introduces the value of the PC, rather than the constant 0, when the RA field has a value 0. The pc_or_gpr function handles expanding the PC special case, since the lvd case would otherwise handle the RA operand similar to all other RA operands as a 0 value representing 0, and the other register values representing that logical register. Lvd is not an architected instruction of, for instance, the POWER architecture, but it is used as an internal operation that describes a load instruction with an implementation defined displacement. In one example, lvx* is a new form of the lvx instruction indicating a last use of at least one register (e.g., defined herein to be the register indicated as <r1> in the template). Lvx is an instruction form that defines the base register (e.g., 4 in this example) as having an unspecified value after execution of the instruction.

In a further example, there is an n-way decode group boundary after the first instruction.

An example template for first DG, is as follows:

```
i1 = addpcis + <r1>, <r2>, <upper>
$EODG
=> optimization:
    addpcis <r1>, <r2>, <upper>
    $EODG (addpcis, <r1>, <r2>, <upper>)
```

An example template for a second DG, is as follows:

```
$BODG (addpcis, <r1>, <r2>, <upper>)
i1 = addi <r1>, <r1>, <lower>
i2 = lvd <vrt>, r0, <r1>
=> optimization:
    lvd      <vrt>, pc_or_gpr(<r2>), combine (<upper>,<lower>)
```

In this case, special handling may be needed with respect to <r1> and <r2> in renaming logic such that when a second portion of the candidate sequence is processed, the second transformation has access to the original physical name of <r2>. (In one embodiment, this might be accomplished by storing the physical register number in conjunction with logical register number.)

In another example, there is an n-way decode group boundary, after a second instruction:

An example template for the first DG, is as follows:

```
i1 = addpcis+ <r1>, <r2>, <upper>
i2 = addi <r1>, <r1>, <lower>
$EODG
=> optimization:
    addpci32 <r1>, <r2>, combine(<upper>, <lower>)
    EODG (addpci, <r1>, <r2>, combine(<upper>, <lower>))
```

In the template above addpci32 represents an internal instruction (iop) corresponding to the addpcis instruction and taking a 32b immediate operand.

An example template for the second DG, is as follows:

```
$BODG (addpci, <r1>, <r2>, <si32>)
    i1 = lvx* <vrt>, r0, <r1>
=> optimization:
    lvd     <vrt>, pc_or_gpr (<r2>), <si32>
    Si32 = signed immediate 32 bits.
```

In this case, special handling may be needed with respect to <r1>=<r2> in renaming logic such that when a second portion of a candidate sequence is processed, the second transformation has access to the original physical name of <r2>. (In one embodiment, this might be done by storing the physical register number in conjunction with the logical register number.)

In one embodiment, a first decode group template can be followed by one of multiple templates for a second decode group, or not any:

One example of a template for a second DG, is as follows:

```
$BODG (addpcis, <r1>, <r2>, <upper>)
    i1 = lwz <r1>, <r1>, <lower>
=> optimization:
    lwz     <r1>, pc_or_gpr(<r2>), combine (<upper>, <lower>)
```

Many other examples of templates are possible. The above templates are just provided as some examples. Additional, less and/or different templates may be provided. Further, the information included in the templates may differ from that described in the example templates provided herein. Many variations are possible.

Figure 10:
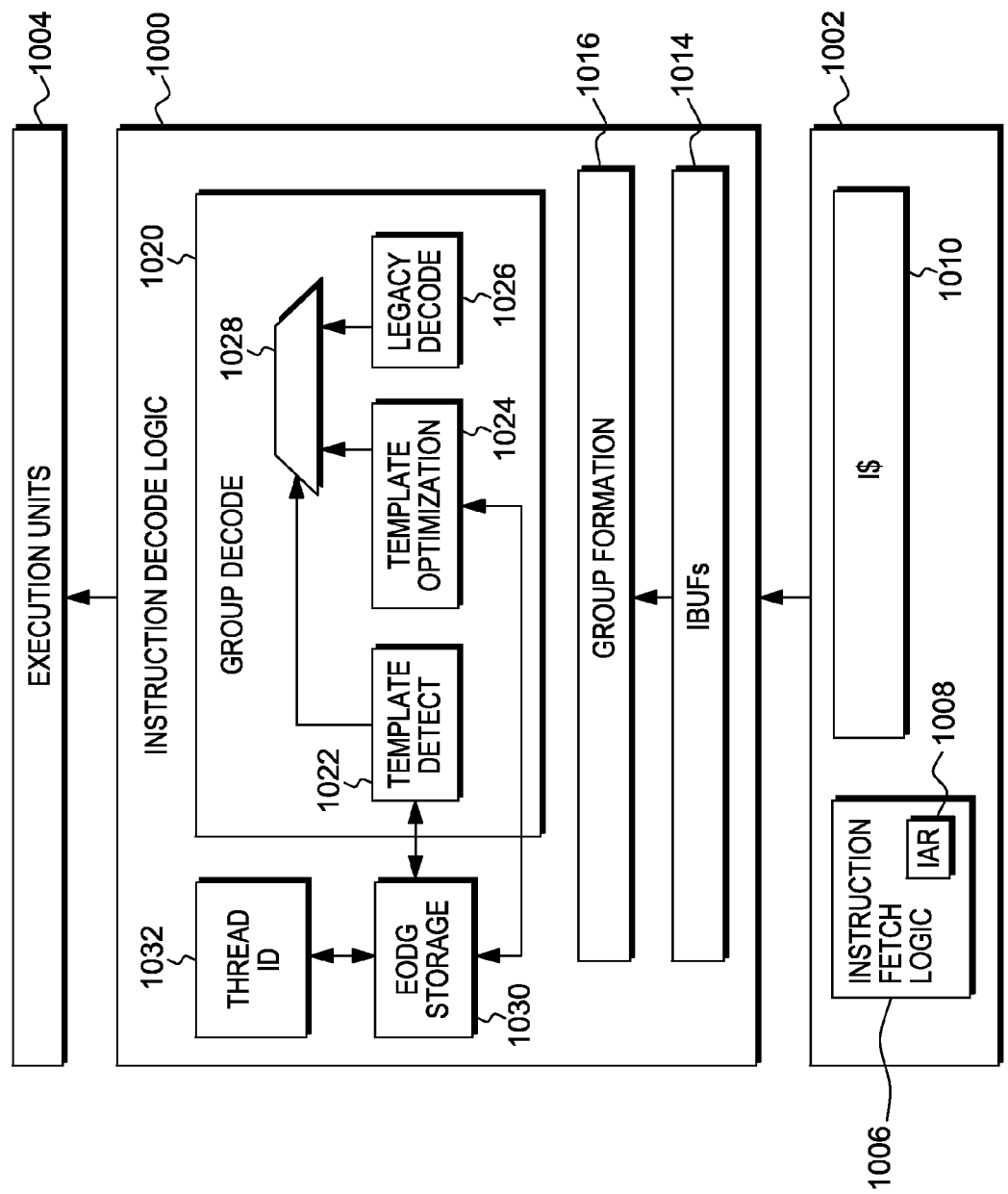
FIG. 10 depicts one example of a decode logic used to form groups of instructions and/or optimize groups of instructions.

One embodiment of a decoder that includes templates to be used in detecting and/or processing instruction sequences, including performing optimizations, is described with reference to FIG. 10. In this example, instruction decode logic 1000 is coupled to an instruction fetch unit 1002 and one or more execution units 1004. The instruction fetch unit includes instruction fetch logic 1006, which references an instruction address register (IAR) 1008. The instruction fetch logic fetches instructions from instruction cache I$ 1010 that are forwarded to the decode unit.

The decode unit includes, for instance, buffers 1014 to accept the instructions. Buffers 1014 are coupled to a group formation unit 1016. Group formation 1016 is coupled to group decode 1020, which includes template detect logic 1022, template optimization 1024, and legacy decode logic 1026. Template detect logic 1022, template optimization 1024, and legacy decode 1026 are coupled to a selector 1028. Template detect 1022 is further coupled to an end of decode group (EODG) storage 1030 that stores information regarding instructions in previous decode groups for one or more threads, each thread having an associated thread ID. In one embodiment, EODG storage receives information to be retained across group boundaries when a template indicates an instruction at the end of a decode group may be the start of a decode group spanning optimization sequence, for a thread. EODG storage provides information about instruction patterns detected at the end of a previous decode group, for a present thread id, to detect continuation of a decode group spanning optimization opportunity, and the operands to effect such optimization. In one embodiment, end of decode group storage 1030 is also coupled to storage 1032 that maintains the thread id for multithreaded environments.

Template detect 1022 is used to determine whether there is a template indicating an optimization for selected instructions, and template optimization is used to perform optimizations based on the templates. Selector 1028 selects the instructions to be executed (e.g., optimized or not).

Group formation 1016 of instruction decode logic 1000 is used in forming groups, based on the templates, and/or performing optimizations at decode time, as described herein.

Described in detail above is the ability to optimize instructions when the instructions to be optimized span two or more groups of instructions. The likelihood that an instruction sequence will span multiple groups increases as larger instruction groups are optimized. The spanning may be at different points within the instruction sequence (e.g., after one instruction, after two instructions, etc.). In one embodiment, instructions which may represent a start of an optimization sequence are identified, and information about those instructions is retained during optimization of the group in which those instructions reside. Then, when a subsequent group is decoded, the retained information is used in performing optimizations for that group, assuming one or more of the instructions of that group are part of the instruction sequence to be optimized.

In one embodiment, different optimizations are performed depending on the instruction group characteristics.

In the logic diagrams that are described herein that have a multiple parts (e.g., FIGS. 8B-8C, 9A-9B, etc.), in a further embodiment, the parts may be combined into one flow. Additionally, although various steps are shown sequentially, in further embodiments, certain steps may be performed in parallel. Other variations are also possible.

As will be appreciated by one skilled in the art, one or aspects may be embodied as a system, method or computer program product. Accordingly, one or more aspects may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, one or more aspects may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 11:
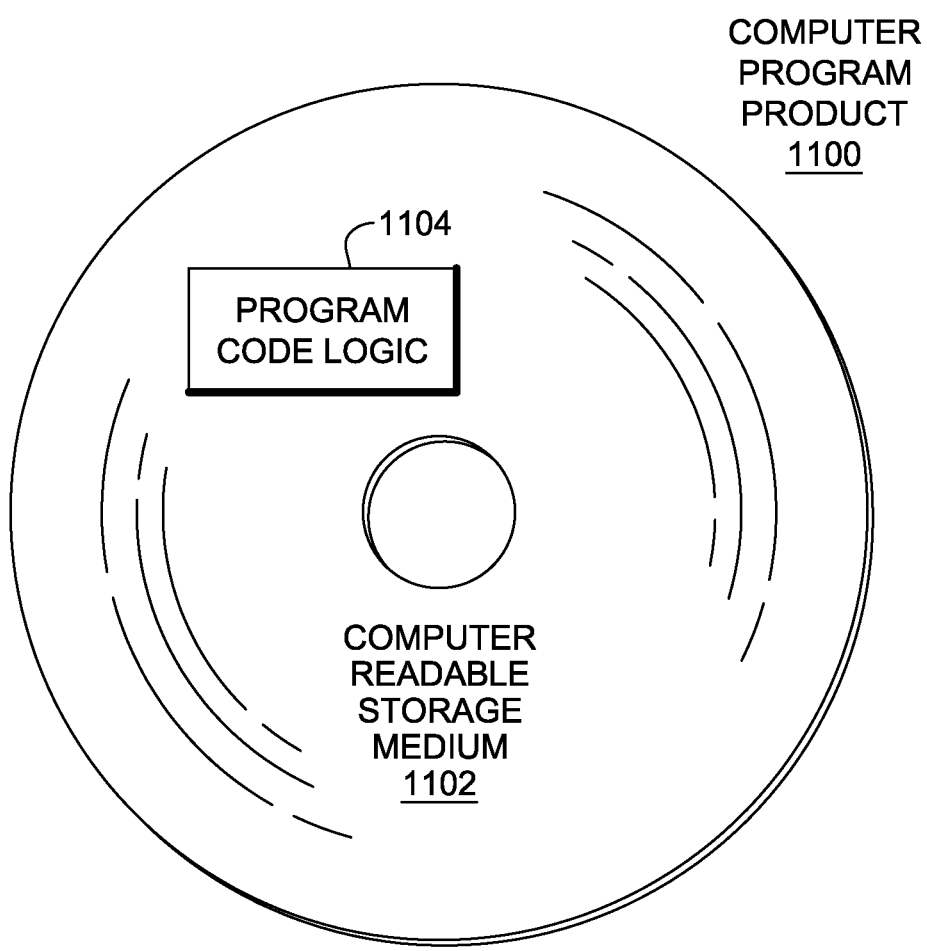
FIG. 11 depicts one embodiment of a computer program product.

Referring now to FIG. 11, in one example, a computer program product 1100 includes, for instance, one or more non-transitory computer readable storage media 1102 to store computer readable program code means or logic 1104 thereon to provide and facilitate one or more aspects.

Program code embodied on a computer readable medium may be transmitted using an appropriate medium, including but not limited to wireless, wireline, optical fiber cable, RF, etc., or any suitable combination of the foregoing.

Computer program code for carrying out operations for one or more aspects may be written in any combination of one or more programming languages, including an object oriented programming language, such as Java, Smalltalk, C++ or the like, and conventional procedural programming languages, such as the "C" programming language, assembler or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

One or more aspects are described herein with reference to flowchart illustrations and/or block diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of one or more aspects. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more aspects. As one example, the deploying of an application comprises providing computer infrastructure operable to perform one or more aspects.

As a further aspect, a computing infrastructure may be deployed comprising integrating computer readable code into a computing system, in which the code in combination with the computing system is capable of performing one or more aspects.

As yet a further aspect, a process for integrating computing infrastructure comprising integrating computer readable code into a computer system may be provided. The computer system comprises a computer readable medium, in which the computer medium comprises one or more aspects. The code in combination with the computer system is capable of performing one or more aspects.

Although various embodiments are described above, these are only examples. For example, processing environments of other architectures can incorporate and use one or more aspects. Additionally, instruction groups of different sizes may be formed, and/or changes may be made to the formation techniques. Further, other types of optimizations may be performed and/or other templates may be used. Many variations are possible.

Further, other types of computing environments can benefit from one or more aspects. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

Figure 12:
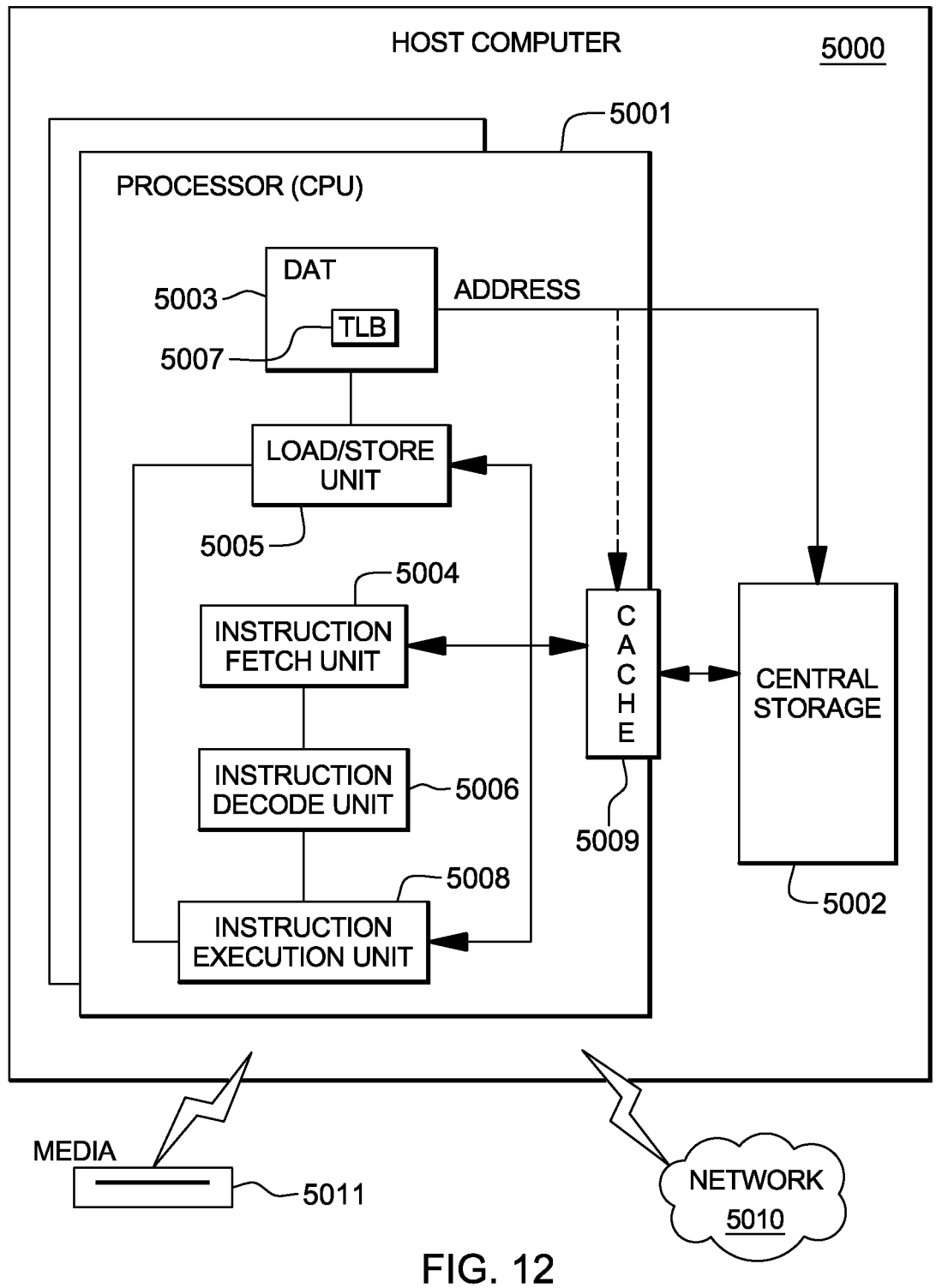
FIG. 12 depicts one embodiment of a host computer system.

Referring to FIG. 12, representative components of a Host Computer system 5000 to implement one or more aspects are portrayed. The representative host computer 5000 comprises one or more CPUs 5001 in communication with computer memory (i.e., central storage) 5002, as well as I/O interfaces to storage media devices 5011 and networks 5010 for communicating with other computers or SANs and the like. The CPU 5001 is compliant with an architecture having an architected instruction set and architected functionality. The CPU 5001 may have dynamic address translation (DAT) 5003 for transforming program addresses (virtual addresses) into real addresses of memory. A DAT typically includes a translation lookaside buffer (TLB) 5007 for caching translations so that later accesses to the block of computer memory 5002 do not require the delay of address translation. Typically, a cache 5009 is employed between computer memory 5002 and the processor 5001. The cache 5009 may be hierarchical having a large cache available to more than one CPU and smaller, faster (lower level) caches between the large cache and each CPU. In some implementations, the lower level caches are split to provide separate low level caches for instruction fetching and data accesses. In one embodiment, an instruction is fetched from memory 5002 by an instruction fetch unit 5004 via a cache 5009. The instruction is decoded in an instruction decode unit 5006 and dispatched (with other instructions in some embodiments) to instruction execution unit or units 5008. Typically several execution units 5008 are employed, for example an arithmetic execution unit, a floating point execution unit and a branch instruction execution unit. The instruction is executed by the execution unit, accessing operands from instruction specified registers or memory as needed. If an operand is to be accessed (loaded or stored) from memory 5002, a load/store unit 5005 typically handles the access under control of the instruction being executed. Instructions may be executed in hardware circuits or in internal microcode (firmware) or by a combination of both.

As noted, a computer system includes information in local (or main) storage, as well as addressing, protection, and reference and change recording. Some aspects of addressing include the format of addresses, the concept of address spaces, the various types of addresses, and the manner in which one type of address is translated to another type of address. Some of main storage includes permanently assigned storage locations. Main storage provides the system with directly addressable fast-access storage of data. Both data and programs are to be loaded into main storage (from input devices) before they can be processed.

Main storage may include one or more smaller, faster-access buffer storages, sometimes called caches. A cache is typically physically associated with a CPU or an I/O processor. The effects, except on performance, of the physical construction and use of distinct storage media are generally not observable by the program.

Separate caches may be maintained for instructions and for data operands. Information within a cache is maintained in contiguous bytes on an integral boundary called a cache block or cache line (or line, for short). A model may provide an EXTRACT CACHE ATTRIBUTE instruction which returns the size of a cache line in bytes. A model may also provide PREFETCH DATA and PREFETCH DATA RELATIVE LONG instructions which effects the prefetching of storage into the data or instruction cache or the releasing of data from the cache.

Storage is viewed as a long horizontal string of bits. For most operations, accesses to storage proceed in a left-to-right sequence. The string of bits is subdivided into units of eight bits. An eight-bit unit is called a byte, which is the basic building block of all information formats. Each byte location in storage is identified by a unique nonnegative integer, which is the address of that byte location or, simply, the byte address. Adjacent byte locations have consecutive addresses, starting with 0 on the left and proceeding in a left-to-right sequence. Addresses are unsigned binary integers and are 24, 31, or 64 bits.

Information is transmitted between storage and a CPU or a channel subsystem one byte, or a group of bytes, at a time. Unless otherwise specified, in, for instance, the z/Architecture®, a group of bytes in storage is addressed by the leftmost byte of the group. The number of bytes in the group is either implied or explicitly specified by the operation to be performed. When used in a CPU operation, a group of bytes is called a field. Within each group of bytes, in, for instance, the z/Architecture®, bits are numbered in a left-to-right sequence. In the z/Architecture®, the leftmost bits are sometimes referred to as the "high-order" bits and the rightmost bits as the "low-order" bits. Bit numbers are not storage addresses, however. Only bytes can be addressed. To operate on individual bits of a byte in storage, the entire byte is accessed. The bits in a byte are numbered 0 through 7, from left to right (in, e.g., the z/Architecture). The bits in an address may be numbered 8-31 or 40-63 for 24-bit addresses, or 1-31 or 33-63 for 31-bit addresses; they are numbered 0-63 for 64-bit addresses. Within any other fixed-length format of multiple bytes, the bits making up the format are consecutively numbered starting from 0. For purposes of error detection, and in preferably for correction, one or more check bits may be transmitted with each byte or with a group of bytes. Such check bits are generated automatically by the machine and cannot be directly controlled by the program. Storage capacities are expressed in number of bytes. When the length of a storage-operand field is implied by the operation code of an instruction, the field is said to have a fixed length, which can be one, two, four, eight, or sixteen bytes. Larger fields may be implied for some instructions. When the length of a storage-operand field is not implied but is stated explicitly, the field is said to have a variable length. Variable-length operands can vary in length by increments of one byte (or with some instructions, in multiples of two bytes or other multiples). When information is placed in storage, the contents of only those byte locations are replaced that are included in the designated field, even though the width of the physical path to storage may be greater than the length of the field being stored.

Certain units of information are to be on an integral boundary in storage. A boundary is called integral for a unit of information when its storage address is a multiple of the length of the unit in bytes. Special names are given to fields of 2, 4, 8, and 16 bytes on an integral boundary. A halfword is a group of two consecutive bytes on a two-byte boundary and is the basic building block of instructions. A word is a group of four consecutive bytes on a four-byte boundary. A doubleword is a group of eight consecutive bytes on an eight-byte boundary. A quadword is a group of 16 consecutive bytes on a 16-byte boundary. When storage addresses designate halfwords, words, doublewords, and quadwords, the binary representation of the address contains one, two, three, or four rightmost zero bits, respectively. Instructions are to be on two-byte integral boundaries. The storage operands of most instructions do not have boundary-alignment requirements.

On devices that implement separate caches for instructions and data operands, a significant delay may be experienced if the program stores into a cache line from which instructions are subsequently fetched, regardless of whether the store alters the instructions that are subsequently fetched.

In one embodiment, the invention may be practiced by software (sometimes referred to licensed internal code, firmware, micro-code, milli-code, pico-code and the like, any of which would be consistent with one or more aspects the present invention). Referring to FIG. 12, software program code which embodies one or more aspects may be accessed by processor 5001 of the host system 5000 from long-term storage media devices 5011, such as a CD-ROM drive, tape drive or hard drive. The software program code may be embodied on any of a variety of known media for use with a data processing system, such as a diskette, hard drive, or CD-ROM. The code may be distributed on such media, or may be distributed to users from computer memory 5002 or storage of one computer system over a network 5010 to other computer systems for use by users of such other systems.

The software program code includes an operating system which controls the function and interaction of the various computer components and one or more application programs. Program code is normally paged from storage media device 5011 to the relatively higher-speed computer storage 5002 where it is available for processing by processor 5001. The techniques and methods for embodying software program code in memory, on physical media, and/or distributing software code via networks are well known and will not be further discussed herein. Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit.

Figure 13:
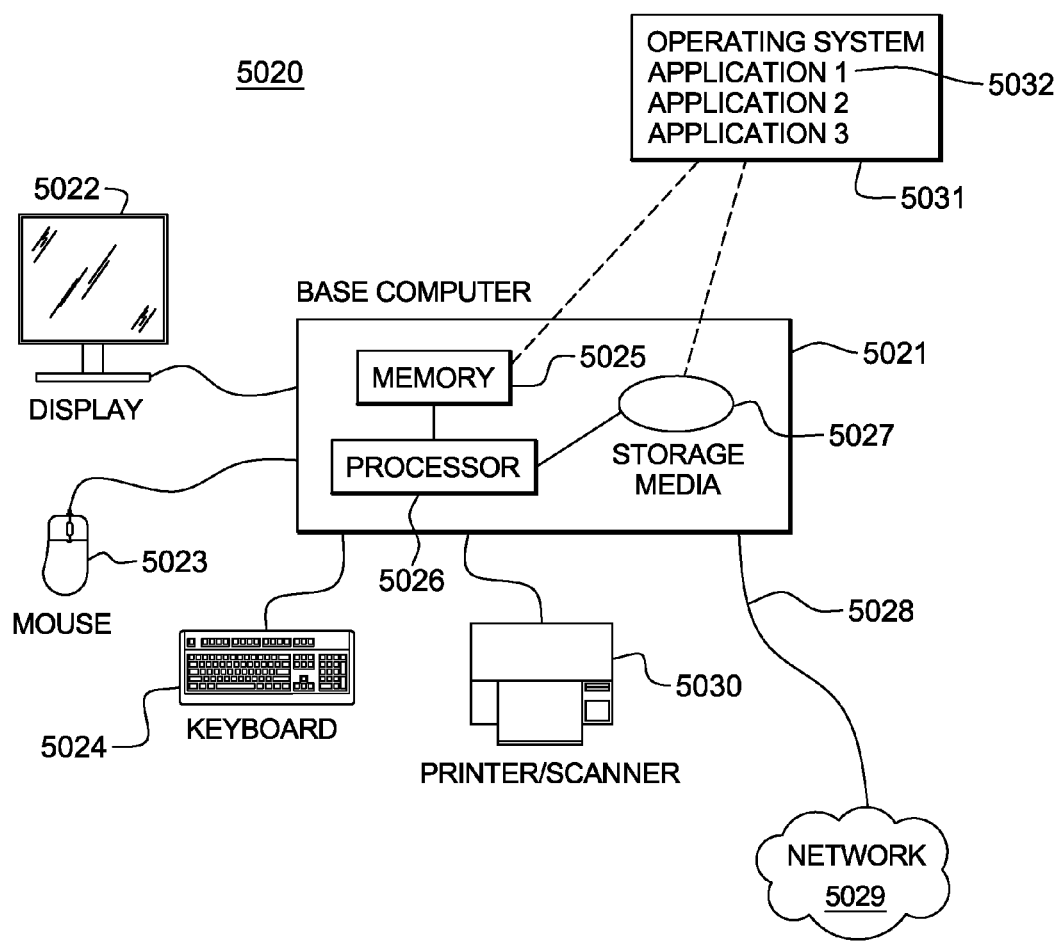
FIG. 13 depicts a further example of a computer system.

FIG. 13 illustrates a representative workstation or server hardware system in which one or more aspects may be practiced. The system 5020 of FIG. 13 comprises a representative base computer system 5021, such as a personal computer, a workstation or a server, including optional peripheral devices. The base computer system 5021 includes one or more processors 5026 and a bus employed to connect and enable communication between the processor(s) 5026 and the other components of the system 5021 in accordance with known techniques. The bus connects the processor 5026 to memory 5025 and long-term storage 5027 which can include a hard drive (including any of magnetic media, CD, DVD and Flash Memory for example) or a tape drive for example. The system 5021 might also include a user interface adapter, which connects the microprocessor 5026 via the bus to one or more interface devices, such as a keyboard 5024, a mouse 5023, a printer/scanner 5030 and/or other interface devices, which can be any user interface device, such as a touch sensitive screen, digitized entry pad, etc. The bus also connects a display device 5022, such as an LCD screen or monitor, to the microprocessor 5026 via a display adapter.

The system 5021 may communicate with other computers or networks of computers by way of a network adapter capable of communicating 5028 with a network 5029. Example network adapters are communications channels, token ring, Ethernet or modems. Alternatively, the system 5021 may communicate using a wireless interface, such as a CDPD (cellular digital packet data) card. The system 5021 may be associated with such other computers in a Local Area Network (LAN) or a Wide Area Network (WAN), or the system 5021 can be a client in a client/server arrangement with another computer, etc. All of these configurations, as well as the appropriate communications hardware and software, are known in the art.

Figure 14:
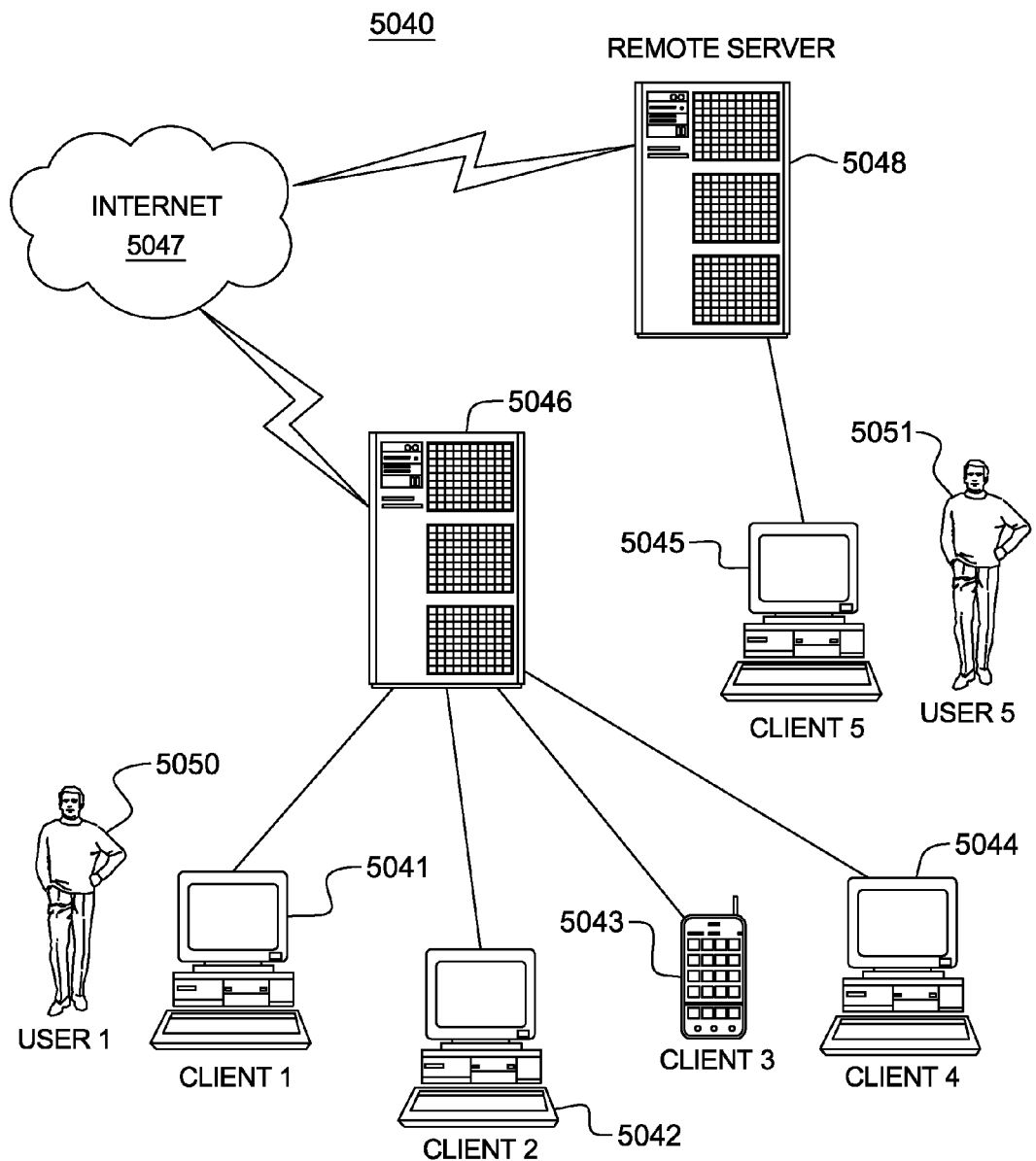
FIG. 14 depicts another example of a computer system comprising a computer network.

FIG. 14 illustrates a data processing network 5040 in which one or more aspects may be practiced. The data processing network 5040 may include a plurality of individual networks, such as a wireless network and a wired network, each of which may include a plurality of individual workstations 5041, 5042, 5043, 5044. Additionally, as those skilled in the art will appreciate, one or more LANs may be included, where a LAN may comprise a plurality of intelligent workstations coupled to a host processor.

Still referring to FIG. 14, the networks may also include mainframe computers or servers, such as a gateway computer (client server 5046) or application server (remote server 5048 which may access a data repository and may also be accessed directly from a workstation 5045). A gateway computer 5046 serves as a point of entry into each individual network. A gateway is needed when connecting one networking protocol to another. The gateway 5046 may be preferably coupled to another network (the Internet 5047 for example) by means of a communications link. The gateway 5046 may also be directly coupled to one or more workstations 5041, 5042, 5043, 5044 using a communications link. The gateway computer may be implemented utilizing an IBM eServer™ System Z® server available from International Business Machines Corporation.

Referring concurrently to FIG. 13 and FIG. 14, software programming code which may embody one or more aspects may be accessed by the processor 5026 of the system 5020 from long-term storage media 5027, such as a CD-ROM drive or hard drive. The software programming code may be embodied on any of a variety of known media for use with a data processing system, such as a diskette, hard drive, or CD-ROM. The code may be distributed on such media, or may be distributed to users 5050, 5051 from the memory or storage of one computer system over a network to other computer systems for use by users of such other systems.

Alternatively, the programming code may be embodied in the memory 5025, and accessed by the processor 5026 using the processor bus. Such programming code includes an operating system which controls the function and interaction of the various computer components and one or more application programs 5032. Program code is normally paged from storage media 5027 to high-speed memory 5025 where it is available for processing by the processor 5026. The techniques and methods for embodying software programming code in memory, on physical media, and/or distributing software code via networks are well known and will not be further discussed herein. Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit.

The cache that is most readily available to the processor (normally faster and smaller than other caches of the processor) is the lowest (L1 or level one) cache and main store (main memory) is the highest level cache (L3 if there are 3 levels). The lowest level cache is often divided into an instruction cache (I-Cache) holding machine instructions to be executed and a data cache (D-Cache) holding data operands.

Figure 15:
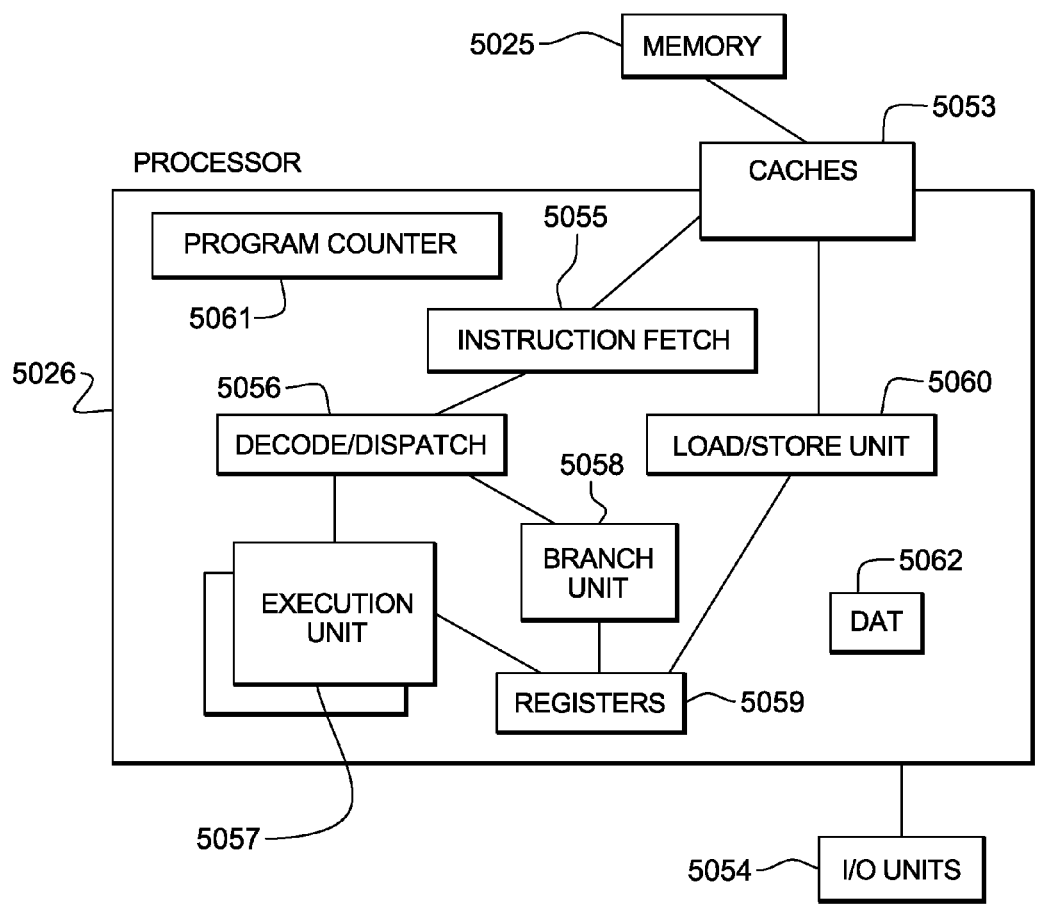
FIG. 15 depicts one embodiment of various elements of a computer system.

Referring to FIG. 15, an exemplary processor embodiment is depicted for processor 5026. Typically one or more levels of cache 5053 are employed to buffer memory blocks in order to improve processor performance. The cache 5053 is a high speed buffer holding cache lines of memory data that are likely to be used. Typical cache lines are 64, 128 or 256 bytes of memory data. Separate caches are often employed for caching instructions than for caching data. Cache coherence (synchronization of copies of lines in memory and the caches) is often provided by various "snoop" algorithms well known in the art. Main memory storage 5025 of a processor system is often referred to as a cache. In a processor system having 4 levels of cache 5053, main storage 5025 is sometimes referred to as the level 5 (L5) cache since it is typically faster and only holds a portion of the non-volatile storage (DASD, tape etc) that is available to a computer system. Main storage 5025 "caches" pages of data paged in and out of the main storage 5025 by the operating system.

A program counter (instruction counter) 5061 keeps track of the address of the current instruction to be executed. A program counter in a z/Architecture® processor is 64 bits and can be truncated to 31 or 24 bits to support prior addressing limits. A program counter is typically embodied in a PSW (program status word) of a computer such that it persists during context switching. Thus, a program in progress, having a program counter value, may be interrupted by, for example, the operating system (context switch from the program environment to the operating system environment). The PSW of the program maintains the program counter value while the program is not active, and the program counter (in the PSW) of the operating system is used while the operating system is executing. Typically, the program counter is incremented by an amount equal to the number of bytes of the current instruction. RISC (Reduced Instruction Set Computing) instructions are typically fixed length while CISC (Complex Instruction Set Computing) instructions are typically variable length. Instructions of the IBM z/Architecture® are CISC instructions having a length of 2, 4 or 6 bytes. The Program counter 5061 is modified by either a context switch operation or a branch taken operation of a branch instruction for example. In a context switch operation, the current program counter value is saved in the program status word along with other state information about the program being executed (such as condition codes), and a new program counter value is loaded pointing to an instruction of a new program module to be executed. A branch taken operation is performed in order to permit the program to make decisions or loop within the program by loading the result of the branch instruction into the program counter 5061.

Typically an instruction fetch unit 5055 is employed to fetch instructions on behalf of the processor 5026. The fetch unit either fetches "next sequential instructions", target instructions of branch taken instructions, or first instructions of a program following a context switch. Modern Instruction fetch units often employ prefetch techniques to speculatively prefetch instructions based on the likelihood that the prefetched instructions might be used. For example, a fetch unit may fetch 16 bytes of instruction that includes the next sequential instruction and additional bytes of further sequential instructions.

The fetched instructions are then executed by the processor 5026. In an embodiment, the fetched instruction(s) are passed to a dispatch unit 5056 of the fetch unit. The dispatch unit decodes the instruction(s) and forwards information about the decoded instruction(s) to appropriate units 5057, 5058, 5060. An execution unit 5057 will typically receive information about decoded arithmetic instructions from the instruction fetch unit 5055 and will perform arithmetic operations on operands according to the opcode of the instruction. Operands are provided to the execution unit 5057 preferably either from memory 5025, architected registers 5059 or from an immediate field of the instruction being executed. Results of the execution, when stored, are stored either in memory 5025, registers 5059 or in other machine hardware (such as control registers, PSW registers and the like).

Figure 16A:
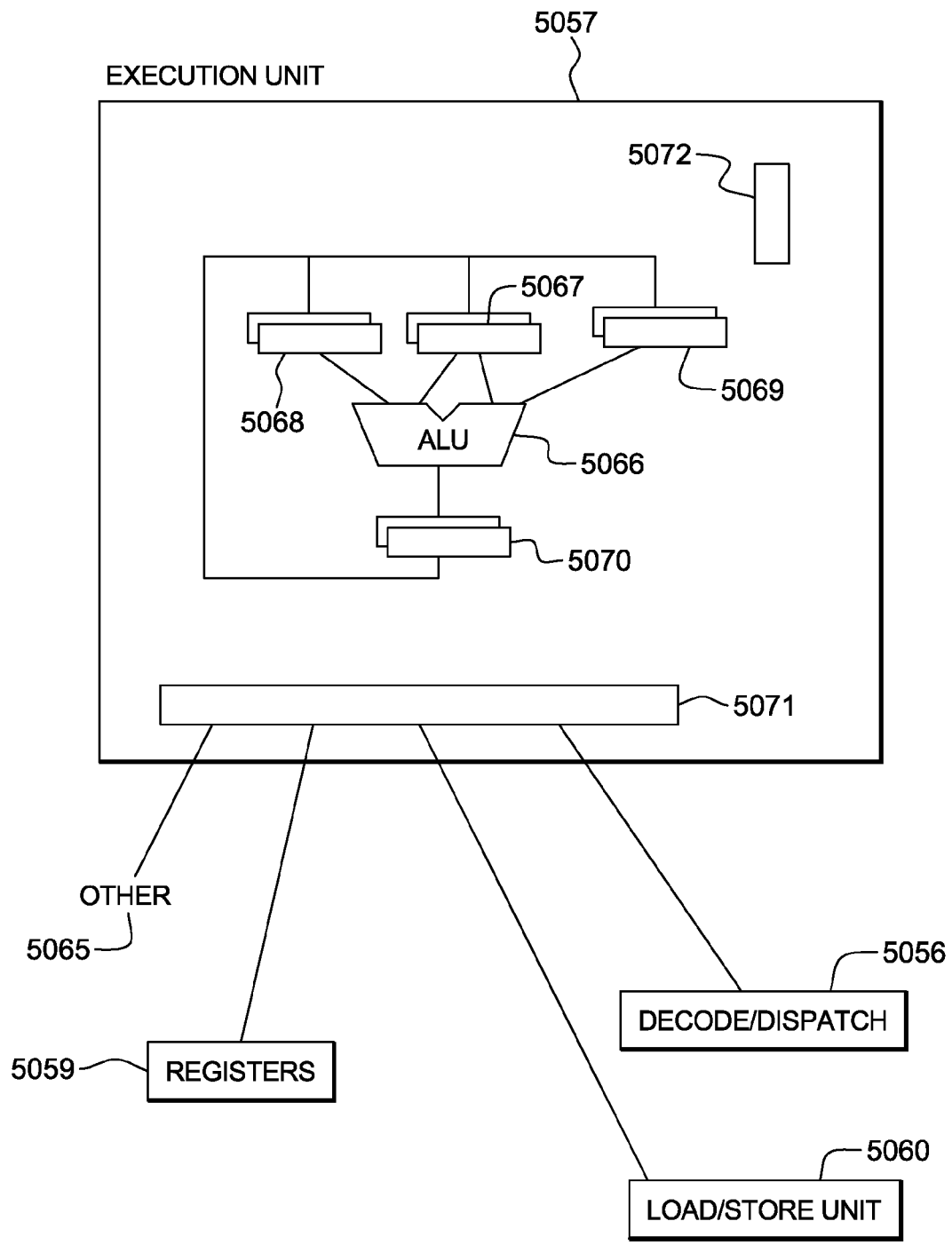
FIG. 16A depicts one embodiment of the execution unit of the computer system of FIG. 15.

A processor 5026 typically has one or more units 5057, 5058, 5060 for executing the function of the instruction. Referring to FIG. 16A, an execution unit 5057 may communicate with architected general registers 5059, a decode/dispatch unit 5056, a load store unit 5060, and other 5065 processor units by way of interfacing logic 5071. An execution unit 5057 may employ several register circuits 5067, 5068, 5069 to hold information that the arithmetic logic unit (ALU) 5066 will operate on. The ALU performs arithmetic operations such as add, subtract, multiply and divide as well as logical function such as and, or and exclusive or (XOR), rotate and shift. Preferably the ALU supports specialized operations that are design dependent. Other circuits may provide other architected facilities 5072 including condition codes and recovery support logic for example. Typically the result of an ALU operation is held in an output register circuit 5070 which can forward the result to a variety of other processing functions. There are many arrangements of processor units, the present description is only intended to provide a representative understanding of one embodiment.

An ADD instruction for example would be executed in an execution unit 5057 having arithmetic and logical functionality while a floating point instruction for example would be executed in a floating point execution having specialized floating point capability. Preferably, an execution unit operates on operands identified by an instruction by performing an opcode defined function on the operands. For example, an ADD instruction may be executed by an execution unit 5057 on operands found in two registers 5059 identified by register fields of the instruction.

The execution unit 5057 performs the arithmetic addition on two operands and stores the result in a third operand where the third operand may be a third register or one of the two source registers. The execution unit preferably utilizes an Arithmetic Logic Unit (ALU) 5066 that is capable of performing a variety of logical functions such as Shift, Rotate, And, Or and XOR as well as a variety of algebraic functions including any of add, subtract, multiply, divide. Some ALUs 5066 are designed for scalar operations and some for floating point. Data may be Big Endian (where the least significant byte is at the highest byte address) or Little Endian (where the least significant byte is at the lowest byte address) depending on architecture. The IBM z/Architecture® is Big Endian. Signed fields may be sign and magnitude, 1's complement or 2's complement depending on architecture. A 2's complement number is advantageous in that the ALU does not need to design a subtract capability since either a negative value or a positive value in 2's complement requires only an addition within the ALU. Numbers are commonly described in shorthand, where a 12 bit field defines an address of a 4,096 byte block and is commonly described as a 4 Kbyte (Kilo-byte) block, for example.

Figure 16B:
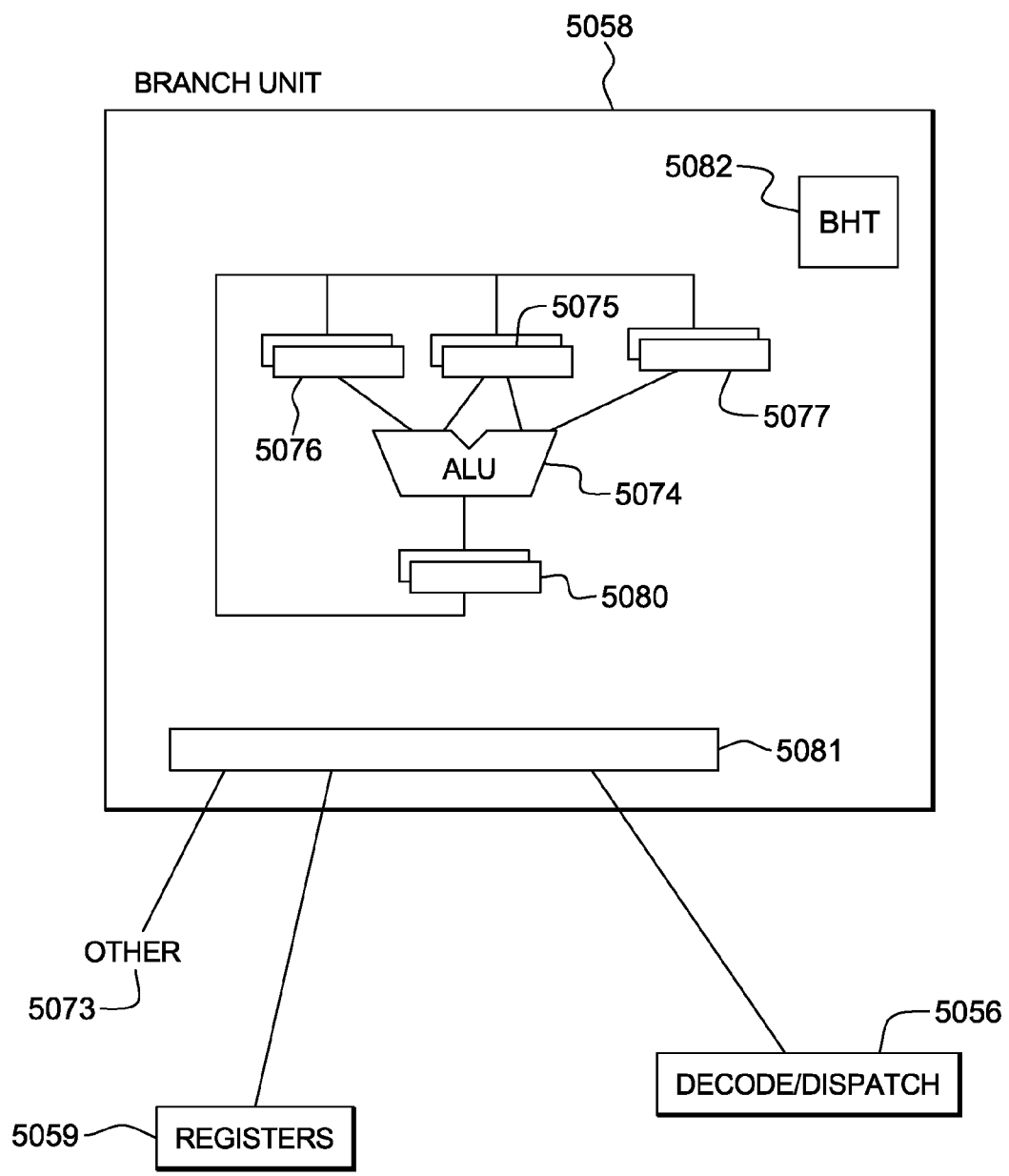
FIG. 16B depicts one embodiment of the branch unit of the computer system of FIG. 15.

Referring to FIG. 16B, branch instruction information for executing a branch instruction is typically sent to a branch unit 5058 which often employs a branch prediction algorithm such as a branch history table 5082 to predict the outcome of the branch before other conditional operations are complete. The target of the current branch instruction will be fetched and speculatively executed before the conditional operations are complete. When the conditional operations are completed the speculatively executed branch instructions are either completed or discarded based on the conditions of the conditional operation and the speculated outcome. A typical branch instruction may test condition codes and branch to a target address if the condition codes meet the branch requirement of the branch instruction, a target address may be calculated based on several numbers including ones found in register fields or an immediate field of the instruction for example. The branch unit 5058 may employ an ALU 5074 having a plurality of input register circuits 5075, 5076, 5077 and an output register circuit 5080. The branch unit 5058 may communicate with general registers 5059, decode dispatch unit 5056 or other circuits 5073, for example.

The execution of a group of instructions can be interrupted for a variety of reasons including a context switch initiated by an operating system, a program exception or error causing a context switch, an I/O interruption signal causing a context switch or multi-threading activity of a plurality of programs (in a multi-threaded environment), for example. Preferably a context switch action saves state information about a currently executing program and then loads state information about another program being invoked. State information may be saved in hardware registers or in memory for example. State information preferably comprises a program counter value pointing to a next instruction to be executed, condition codes, memory translation information and architected register content. A context switch activity can be exercised by hardware circuits, application programs, operating system programs or firmware code (microcode, pico-code or licensed internal code (LIC)) alone or in combination.

A processor accesses operands according to instruction defined methods. The instruction may provide an immediate operand using the value of a portion of the instruction, may provide one or more register fields explicitly pointing to either general purpose registers or special purpose registers (floating point registers for example). The instruction may utilize implied registers identified by an opcode field as operands. The instruction may utilize memory locations for operands. A memory location of an operand may be provided by a register, an immediate field, or a combination of registers and immediate field as exemplified by the z/Architecture® long displacement facility wherein the instruction defines a base register, an index register and an immediate field (displacement field) that are added together to provide the address of the operand in memory for example. Location herein typically implies a location in main memory (main storage) unless otherwise indicated.

Figure 16C:
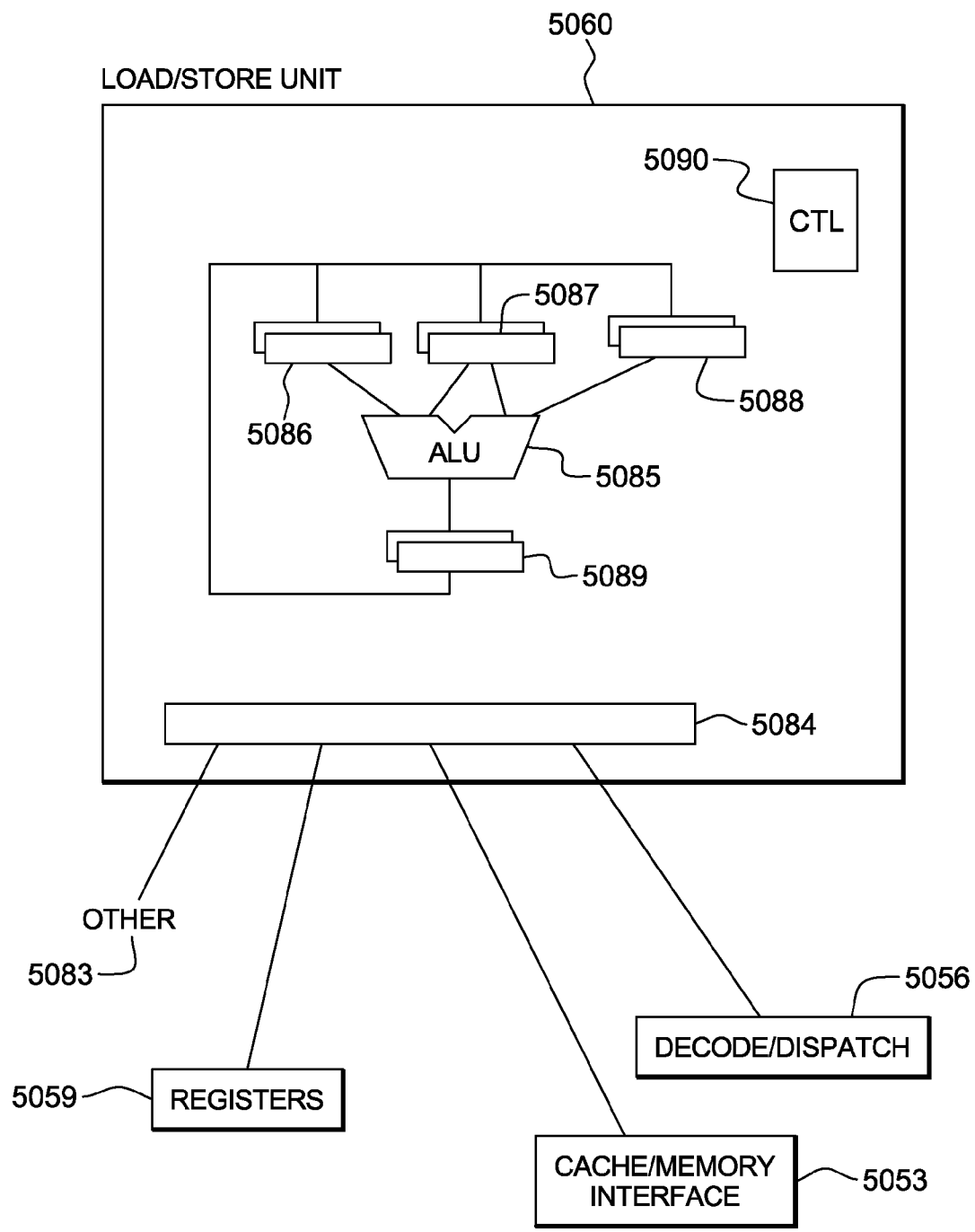
FIG. 16C depicts one embodiment of the load/store unit of the computer system of FIG. 15.

Referring to FIG. 16C, a processor accesses storage using a load/store unit 5060. The load/store unit 5060 may perform a load operation by obtaining the address of the target operand in memory 5053 and loading the operand in a register 5059 or another memory 5053 location, or may perform a store operation by obtaining the address of the target operand in memory 5053 and storing data obtained from a register 5059 or another memory 5053 location in the target operand location in memory 5053. The load/store unit 5060 may be speculative and may access memory in a sequence that is out-of-order relative to instruction sequence, however the load/store unit 5060 is to maintain the appearance to programs that instructions were executed in order. A load/store unit 5060 may communicate with general registers 5059, decode/dispatch unit 5056, cache/memory interface 5053 or other elements 5083 and comprises various register circuits, ALUs 5085 and control logic 5090 to calculate storage addresses and to provide pipeline sequencing to keep operations in-order. Some operations may be out of order but the load/store unit provides functionality to make the out of order operations to appear to the program as having been performed in order, as is well known in the art.

Preferably addresses that an application program "sees" are often referred to as virtual addresses. Virtual addresses are sometimes referred to as "logical addresses" and "effective addresses". These virtual addresses are virtual in that they are redirected to physical memory location by one of a variety of dynamic address translation (DAT) technologies including, but not limited to, simply prefixing a virtual address with an offset value, translating the virtual address via one or more translation tables, the translation tables preferably comprising at least a segment table and a page table alone or in combination, preferably, the segment table having an entry pointing to the page table. In the z/Architecture®, a hierarchy of translation is provided including a region first table, a region second table, a region third table, a segment table and an optional page table. The performance of the address translation is often improved by utilizing a translation lookaside buffer (TLB) which comprises entries mapping a virtual address to an associated physical memory location. The entries are created when the DAT translates a virtual address using the translation tables. Subsequent use of the virtual address can then utilize the entry of the fast TLB rather than the slow sequential translation table accesses. TLB content may be managed by a variety of replacement algorithms including LRU (Least Recently used).

In the case where the processor is a processor of a multi-processor system, each processor has responsibility to keep shared resources, such as I/O, caches, TLBs and memory, interlocked for coherency. Typically, "snoop" technologies will be utilized in maintaining cache coherency. In a snoop environment, each cache line may be marked as being in any one of a shared state, an exclusive state, a changed state, an invalid state and the like in order to facilitate sharing.

I/O units 5054 (FIG. 15) provide the processor with means for attaching to peripheral devices including tape, disc, printers, displays, and networks for example. I/O units are often presented to the computer program by software drivers. In mainframes, such as the System Z® from IBM®, channel adapters and open system adapters are I/O units of the mainframe that provide the communications between the operating system and peripheral devices.

Further, other types of computing environments can benefit from one or more aspects. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

More particularly, in a mainframe, architected machine instructions are used by programmers, usually today "C" programmers, often by way of a compiler application. These instructions stored in the storage medium may be executed natively in a z/Architecture® IBM® Server, or alternatively in machines executing other architectures. They can be emulated in the existing and in future IBM® mainframe servers and on other machines of IBM® (e.g., Power Systems servers and System X® Servers). They can be executed in machines running Linux on a wide variety of machines using hardware manufactured by IBM®, Intel®, AMD™, and others. Besides execution on that hardware under a z/Architecture, Linux can be used as well as machines which use emulation by Hercules, UMX, or FSI (Fundamental Software, Inc), where generally execution is in an emulation mode. In emulation mode, emulation software is executed by a native processor to emulate the architecture of an emulated processor.

The native processor typically executes emulation software comprising either firmware or a native operating system to perform emulation of the emulated processor. The emulation software is responsible for fetching and executing instructions of the emulated processor architecture. The emulation software maintains an emulated program counter to keep track of instruction boundaries. The emulation software may fetch one or more emulated machine instructions at a time and convert the one or more emulated machine instructions to a corresponding group of native machine instructions for execution by the native processor. These converted instructions may be cached such that a faster conversion can be accomplished. Notwithstanding, the emulation software is to maintain the architecture rules of the emulated processor architecture so as to assure operating systems and applications written for the emulated processor operate correctly. Furthermore, the emulation software is to provide resources identified by the emulated processor architecture including, but not limited to, control registers, general purpose registers, floating point registers, dynamic address translation function including segment tables and page tables for example, interrupt mechanisms, context switch mechanisms, Time of Day (TOD) clocks and architected interfaces to I/O subsystems such that an operating system or an application program designed to run on the emulated processor, can be run on the native processor having the emulation software.

A specific instruction being emulated is decoded, and a subroutine is called to perform the function of the individual instruction. An emulation software function emulating a function of an emulated processor is implemented, for example, in a "C" subroutine or driver, or some other method of providing a driver for the specific hardware as will be within the skill of those in the art after understanding the description of the preferred embodiment. Various software and hardware emulation patents including, but not limited to U.S. Pat. No. 5,551,013, entitled "Multiprocessor for Hardware Emulation", by Beausoleil et al.; and U.S. Pat. No. 6,009,261, entitled "Preprocessing of Stored Target Routines for Emulating Incompatible Instructions on a Target Processor", by Scalzi et al; and U.S. Pat. No. 5,574,873, entitled "Decoding Guest Instruction to Directly Access Emulation Routines that Emulate the Guest Instructions", by Davidian et al; and U.S. Pat. No. 6,308,255, entitled "Symmetrical Multiprocessing Bus and Chipset Used for Coprocessor Support Allowing Non-Native Code to Run in a System", by Gorishek et al; and U.S. Pat. No. 6,463,582, entitled "Dynamic Optimizing Object Code Translator for Architecture Emulation and Dynamic Optimizing Object Code Translation Method", by Lethin et al; and U.S. Pat. No. 5,790,825, entitled "Method for Emulating Guest Instructions on a Host Computer Through Dynamic Recompilation of Host Instructions", by Eric Traut, each of which is hereby incorporated herein by reference in its entirety; and many others, illustrate a variety of known ways to achieve emulation of an instruction format architected for a different machine for a target machine available to those skilled in the art.

Figure 17:
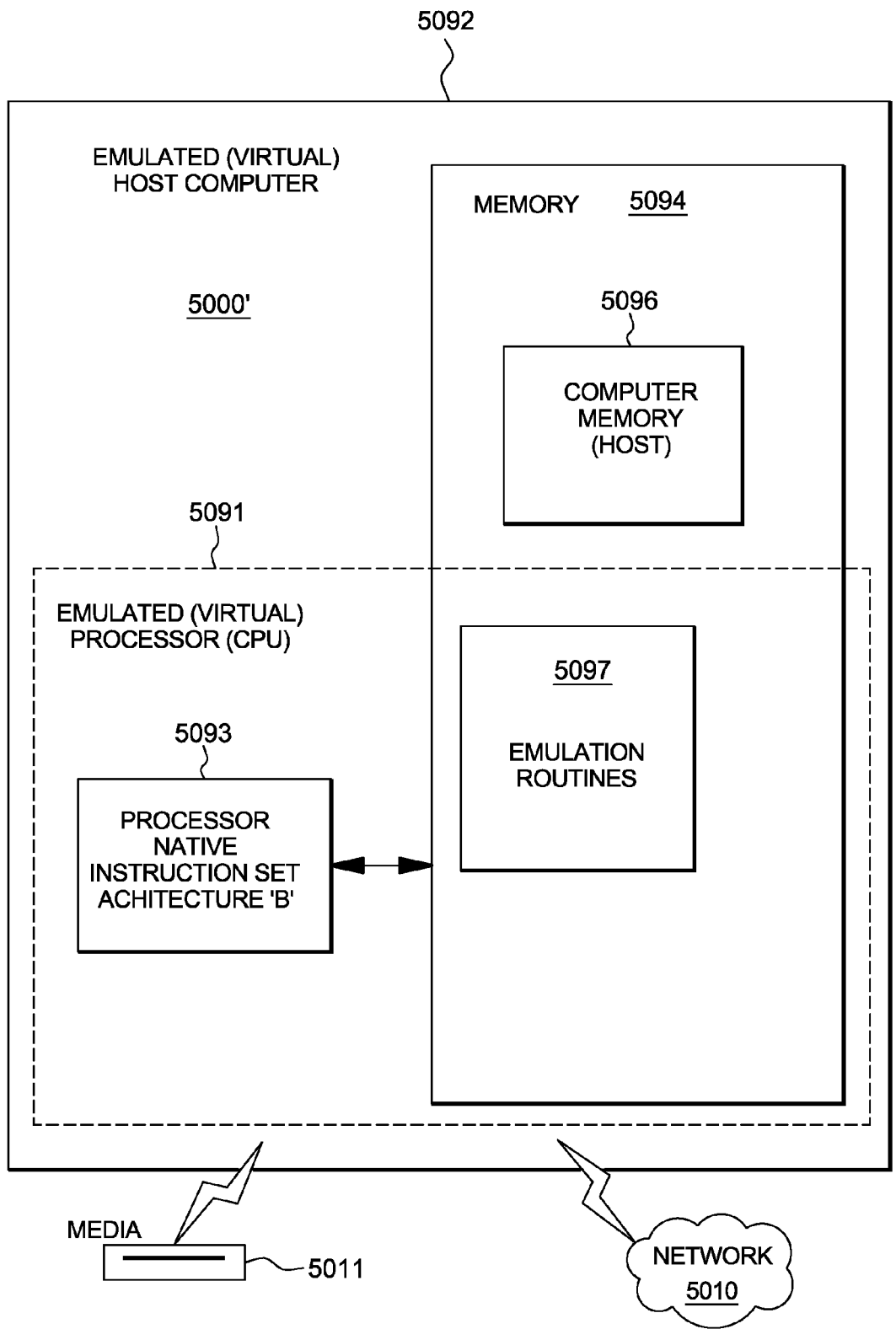
FIG. 17 depicts one embodiment of an emulated host computer system to incorporate and use one or more aspects.

In FIG. 17, an example of an emulated host computer system 5092 is provided that emulates a host computer system 5000' of a host architecture. In the emulated host computer system 5092, the host processor (CPU) 5091 is an emulated host processor (or virtual host processor) and comprises an emulation processor 5093 having a different native instruction set architecture than that of the processor 5091 of the host computer 5000'. The emulated host computer system 5092 has memory 5094 accessible to the emulation processor 5093. In the example embodiment, the memory 5094 is partitioned into a host computer memory 5096 portion and an emulation routines 5097 portion. The host computer memory 5096 is available to programs of the emulated host computer 5092 according to host computer architecture. The emulation processor 5093 executes native instructions of an architected instruction set of an architecture other than that of the emulated processor 5091, the native instructions obtained from emulation routines memory 5097, and may access a host instruction for execution from a program in host computer memory 5096 by employing one or more instruction(s) obtained in a sequence & access/decode routine which may decode the host instruction(s) accessed to determine a native instruction execution routine for emulating the function of the host instruction accessed. Other facilities that are defined for the host computer system 5000' architecture may be emulated by architected facilities routines, including such facilities as general purpose registers, control registers, dynamic address translation and I/O subsystem support and processor cache, for example. The emulation routines may also take advantage of functions available in the emulation processor 5093 (such as general registers and dynamic translation of virtual addresses) to improve performance of the emulation routines. Special hardware and off-load engines may also be provided to assist the processor 5093 in emulating the function of the host computer 5000'.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more aspects has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer program product for facilitating processing in a processing environment, said computer program product comprising:
a non-transitory computer readable storage medium readable by a processing circuit and storing instructions for execution by the processing circuit for performing a method comprising:
obtaining a first group of instructions;
determining whether one or more instructions of the first group of instructions are to be optimized with one or more instructions of a second group of instructions, the determining comprising determining that an instruction of the one or more instructions of the first group of instructions is a start of a spanning optimization sequence of instructions, the spanning optimization sequence of instructions spanning at least the first group of instructions and the second group of instructions;
based on determining that the instruction of the one or more instructions of the first group of instructions is the start of a spanning optimization sequence of instructions, retaining information regarding at least one instruction of the first group of instructions;
based on determining that the one or more instructions of the first group of instructions are to be optimized with one or more instructions of the second group of instructions, performing optimization across the first group of instructions and the second group of instructions, the performing optimization using the retained information; and
executing at least one instruction resulting from performing the optimization.

2. The computer program product of claim 1, wherein the performing optimization comprises generating at least one internal operation that represents at least a portion of an instruction in the first group of instructions and at least a portion of an instruction in the second group of instructions.

3. The computer program product of claim 1, wherein the information includes a thread identifier of a thread associated with executing the one or more instructions of the first group of instructions.

4. The computer program product of claim 1, wherein the determining comprises:
checking whether the one or more instructions of the first group of instructions is associated with a same thread of execution as the one or more instructions of the second group of instructions; and
preventing optimization to be performed across the first group of instructions and the second group of instructions based on the checking indicating different threads of execution are being used.

5. The computer program product of claim 1, wherein the method further comprises performing optimization within the first group of instructions, wherein optimization is performed within the first group of instructions and across the first group of instructions and the second group of instructions.

6. The computer program product of claim 1, wherein the performing optimization comprises using one or more templates to perform the optimization.

7. The computer program product of claim 1, wherein the optimization is performed at decode time.

8. A computer system for facilitating processing in a processing environment, said computer system comprising:
a memory; and
a processor in communications with the memory, wherein the computer system is configured to perform a method, said method comprising:
obtaining a first group of instructions;
determining whether one or more instructions of the first group of instructions are to be optimized with one or more instructions of a second group of instructions, the determining comprising determining that an instruction of the one or more instructions of the first group of instructions is a start of a spanning optimization sequence of instructions, the spanning optimization sequence of instructions spanning at least the first group of instructions and the second group of instructions;
based on determining that the instruction of the one or more instructions of the first group of instructions is the start of a spanning optimization sequence of instructions, retaining information regarding at least one instruction of the first group of instructions;
based on determining that the one or more instructions of the first group of instructions are to be optimized with one or more instructions of the second group of instructions, performing optimization across the first group of instructions and the second group of instructions, the performing optimization using the retained information; and
executing at least one instruction resulting from performing the optimization.

9. The computer system of claim 8, wherein the performing optimization comprises generating at least one internal operation that represents at least a portion of an instruction in the first group of instructions and at least a portion of an instruction in the second group of instructions.

10. The computer system of claim 8, wherein the information includes a thread identifier of a thread associated with executing the one or more instructions of the first group of instructions.

11. The computer system of claim 8, wherein the determining comprises:
checking whether the one or more instructions of the first group of instructions is associated with a same thread of execution as the one or more instructions of the second group of instructions; and
preventing optimization to be performed across the first group of instructions and the second group of instructions based on the checking indicating different threads of execution are being used.

12. The computer system of claim 8, wherein the method further comprises performing optimization within the first group of instructions, wherein optimization is performed within the first group of instructions and across the first group of instructions and the second group of instructions.

13. The computer system of claim 8, wherein the optimization is performed at decode time.

14. A method of facilitating processing in a processing environment, said method comprising:
obtaining, by a processor, a first group of instructions;
determining whether one or more instructions of the first group of instructions are to be optimized with one or more instructions of a second group of instructions, the determining comprising determining that an instruction of the one or more instructions of the first group of instructions is a start of a spanning optimization sequence of instructions, the spanning optimization sequence of instructions spanning at least the first group of instructions and the second group of instructions;

based on determining that the instruction of the one or more instructions of the first group of instructions is the start of a spanning optimization sequence of instructions, retaining information regarding at least one instruction of the first group of instructions;

based on determining that the one or more instructions of the first group of instructions are to be optimized with one or more instructions of the second group of instructions, performing optimization across the first group of instructions and the second group of instructions, the performing optimization using the retained information; and executing at least one instruction resulting from performing the optimization.

15. The method of claim 14, wherein the determining comprises:

checking whether the one or more instructions of the first group of instructions is associated with a same thread of execution as the one or more instructions of the second group of instructions; and preventing optimization to be performed across the first group of instructions and the second group of instructions based on the checking indicating different threads of execution are being used.

* * * * *